United States Patent [19]
Al-Dabbagh

[11] Patent Number: 5,602,709
[45] Date of Patent: Feb. 11, 1997

[54] HIGH IMPEDANCE FAULT DETECTOR

[75] Inventor: Majid Al-Dabbagh, Wheelers Hill, Australia

[73] Assignee: Technisearch Limited, Australia

[21] Appl. No.: 367,158

[22] PCT Filed: Jul. 9, 1993

[86] PCT No.: PCT/AU93/00342

§ 371 Date: Mar. 16, 1995

§ 102(e) Date: Mar. 16, 1995

[87] PCT Pub. No.: WO94/01910

PCT Pub. Date: Jan. 20, 1994

[30] Foreign Application Priority Data

Jul. 10, 1992 [AU] Australia .................. PL 3451

[51] Int. Cl.$^6$ ...................................................... H02H 3/46
[52] U.S. Cl. .................. 361/85; 361/65; 361/89; 361/94; 324/76.42; 324/520
[58] Field of Search .................. 361/42, 46–50, 361/65, 87, 76, 78, 79, 80, 86, 87, 88, 89, 93, 94; 324/76.41, 76.42–76.45, 520, 521, 522, 541, 544

[56] References Cited

U.S. PATENT DOCUMENTS

| | | | |
|---|---|---|---|
| 4,466,071 | 8/1984 | Russell, Jr. | 364/492 |
| 5,185,684 | 2/1993 | Beihoff et al. | 361/45 |

FOREIGN PATENT DOCUMENTS

| | | |
|---|---|---|
| 12863 | 9/1992 | Australia . |
| 88/05543 | 7/1988 | WIPO . |
| 93/03530 | 2/1993 | WIPO . |

OTHER PUBLICATIONS

IEEE Transactions on Power Delivery, vol. 6, No. 2, issued Apr. 1991, W. H. Kwon et al., "High Impedance Fault Detection Utilizing Incremental Variance of Normalized Even Order Harmonic Power", pp. 557–563.

IEEE Transactions on Power Delivery, vol. 6, No. 2, issued Apr. 1991, D. I. Jeerings et al., "A Practical Protective Relay for Down–Conductor Faults", pp. 565–571.

Primary Examiner—Jeffrey A. Gaffin
Assistant Examiner—Ronald W. Leja
Attorney, Agent, or Firm—Bell, Seltzer, Park & Gibson, P.A.

[57] ABSTRACT

A method and apparatus for detecting high impedance faults and other arcing phenomena in an electrical distribution system. Electrical signals on the distribution system are monitored and a number of frequency components isolated, such as zero-sequence current and voltage, second harmonic voltage, third harmonic current, eighth harmonic voltage and current, and a measure of magnitude of the components are taken over successive data acquisition periods. The measures of the component magnitudes are formed into a pattern for each data acquisition period, and the difference between patterns for successive periods are compared against a pattern threshold which is set to suit the characteristics of the distribution system. A pattern difference greater than the pattern threshold indicates the possibility of an arcing fault, which can then be confirmed by determining whether the frequency components are modulated at twice the fundamental frequency of the distribution system.

23 Claims, 13 Drawing Sheets

HIGH IMPEDANCE FAULT DETECTOR

This invention relates to a method and means for detecting a high impedance fault or arcing phenomenon in an alternating current electrical distribution system.

For the purpose of supplying uninterrupted power to consumers, protection systems must isolate any type of electrical fault which may occur in the electrical distribution system under various conditions. In modern distribution systems, protective relay means have been developed to cope with most circumstances, and these systems are able to respond rapidly to sudden and sometimes violent changes in current and voltage caused by short circuits. However, the problem of high impedance faults presents a major concern since many relay systems are unable to respond quickly and accurately under such conditions. A high impedance fault is a type of electrical fault which commonly occurs in a distribution feeder when the fault current flows through an equivalent high impedance which is caused by an electric arc. Because high impedance faults are often associated with electric arcs they are sometimes called an "arcing fault".

A typical single phase high impedance fault occurs when a plant such as a tree branch contacts a high voltage distribution power line, which often results in an arc between the plant and the power line. From the point of view of a protective relay situated at the distribution point for the power line the arc between the plant and the power line will present a high impedance. Further, if the protective relay is not able to detect the fault the result may be quite catastrophic, for example resulting in a bush fire.

Protective relay systems are often not able to detect such high impedance faults because fault currents are often far too small to be recognized by conventional relay systems. There are often no rapid nor ample changes in voltage or current waveforms when high impedance faults occur because the impedance from the power line to ground is quite high.

It is common for low current, high impedance faults to occur on distribution feeders and other relatively low voltage power lines. A high impedance fault usually occurs when a distribution line conductor is contacted by a high impedance grounded object, such as a tree, or when a conductor breaks and falls onto a poorly conducting earth surface. A great deal of research in the past has concentrated on creating more sensitive ground fault detection devices, since many researchers believed that high impedance faults were often not detected because the protective relays were not sensitive enough. Consequently, much research has gone into the design of very sensitive over current relays, in particular zero sequence over current relays for distribution networks. Although this research has improved grounded fault protection systems, the problem of low current faults remaining undetected has remained, the reason for this being that these devices may not distinguish fault currents below normal load levels.

Recent research has investigated the characteristics of high impedance faults and the use of signals other than fundamental frequency signals to detect high impedance faults. It was found that one of the most important characteristics observed during arcing faults is that harmonic signals increase to a measurable value which may be detected during occurrence of a fault. For example, research at Texas A & M University has addressed the characterisation of fault currents associated with downed conductors. From this fundamental understanding of low current fault characteristics a technique was developed which utilised high frequency (two kilohertz to ten kilohertz) current components for fault detection. This technique is based on the observation that arcing was almost always associated with downed conductors resulting in a modulated current waveform rich in high frequency components. The high impedance fault detector therefore utilised high frequency components to detect the occurrence of a high impedance fault, and operated in a satisfactory manner under certain operational conditions. However, field tests have shown that these high frequency signals can often not propagate past capacitor banks which are present in electrical distribution systems, and hence the system is unable to perform in many practical applications.

Further research on high impedance faults has shown that harmonic content during a high impedance fault is dependent upon many parameters. The harmonic content during a fault can be effected by many physical and environmental variables such as feeder configuration, shape of fault point, the manner in which a fault performs, load type and level and the prevailing weather. Using a single detection parameter such a high frequency signal, a low frequency signal, or a third harmonic frequency signal has been shown to have difficulties in detecting high impedance faults under certain conditions. Therefore, the most recent research has concentrated on detecting high impedance faults using multiple detection parameters, however this research has also indicated that arcing faults are complicated phenomena, the behaviour of which is influenced by a large number of physical variables and environmental parameters which are difficult to quantify. In this light, leading researchers C. J. Kim and V. Don Russell from Texas A & M University, in a report entitled "A learning method for use in intelligent computer relays for high impedance faults" (IEEE Transactions on Power Delivery, Volume 6, No. 1, January 1991 pages 109 to 115) stated that "the behaviour of the parameters of high impedance faults is very random and, in most cases, unpredictable".

The present invention, in summary, provides a method for detecting a high impedance fault or arcing phenomenon in an AC electrical distribution system having a fundamental frequency, comprising:

a. monitoring electrical signals in said electrical distribution system;

b. isolating a plurality of predetermined frequency components from the monitored electrical signals;

c. scaling the magnitudes of said predetermined frequency components according to selected scaling factors;

d. comparing said sealed magnitudes from a first data acquisition period with the scaled magnitudes from a preceding data acquisition period; and e. detecting the occurrence of a high impedance fault or arcing phenomenon on the basis of said comparison.

The step of comparing said scaled magnitudes may comprise comparing the sum of said scaled magnitudes during said first data acquisition period with the sum of the scaled magnitudes during said preceding data acquisition period.

Further, the step of scaling the magnitude of a given predetermined frequency component may comprise determining and summing the number of sub-periods of a data acquisition period during which the given frequency component is greater than a selected value, and multiplying the resulting sum by a scaling factor corresponding to said given frequency component.

Preferably the detection of the possibility of a high impedance fault is determined by a comparison of the scaled magnitudes during first, second and third sequential data acquisition periods.

Preferably one of said predetermined frequency components is twice said fundamental frequency.

Preferably said plurality of predetermined frequency components comprises eight voltage and/or current signals.

The plurality of predetermined frequency components may include zero sequence current and voltage signals, and these zero sequence current and voltage signals may be utilised to detect solid ground faults, particularly in the case that the electrical feeder line comprises a three phase, four wire line.

In order, for example, to prevent damage occurring as a result of the high impedance fault, the method may also include a step of issuing a trip signal when the possibility of a high impedance fault is detected, to cause said at least one electrical feeder line to be isolated from the source of said AC electricity.

In accordance with the invention there is also provided a method for detecting an arcing phenomenon in an electrical distribution system comprising the steps of:

monitoring n selected frequency components $C_n$ of the voltage and current at a point on the distribution system;

generating a first pattern $M_j$ ($C_n$) representative of the magnitudes of the selected frequency components during a first data acquisition period;

comparing the first pattern with a previously stored pattern $M_{j-1}$ ($C_n$) to determine whether the difference therebetween exceeds a pattern threshold Mt ($C_n$) such that $$|M_j (C_n) - M_{j-1} (C_n)| > M_t (C_n) \text{ for all } n; \text{ and}$$

determining the occurrence of an arcing phenomenon in the system on the basis of the comparison.

The present invention also provides a method for detecting the possible existence of a high impedance fault in an electrical distribution system conveying AC electricity of a fundamental frequency, comprising:

monitoring electrical signals in said electrical distribution system;

isolating a plurality of predetermined frequency components from the monitored electrical signals;

sampling the frequency components during at least one data acquisition period;

forming and storing a first pattern corresponding to the samples during said at least one data acquisition period;

comparing said first pattern with a previously stored template pattern; and determining the possible existence of a high impedance fault on the basis of said comparison.

The template pattern may comprise a calculated threshold pattern or may comprise a pattern formed and stored from samples of said frequency components during a sequentially preceding data acquisition period. Where the template pattern comprises a previously sampled and stored pattern, a step may be provided of forming a second pattern from sampling the frequency components during a further data acquisition period, and comparing said template pattern with both said first and second patterns to determine the possible existence of a high impedance fault.

A step of confirming the existence of a high impedance fault may also be included, comprising analysing a sequence of chronologically sampled data from at least one of said plurality of frequency components to determine whether the magnitudes of the at least one frequency component is modulated at twice said fundamental frequency.

The present invention also provides a high impedance fault or arcing phenomenon detector for use in an electrical distribution system including at least one electrical feeder line for conveying AC electricity of a fundamental frequency, said detector comprising:

a. monitoring means for monitoring electrical signals on said at least one electrical feeder line;

b. filtering means for isolating a plurality of predetermined frequency components from the monitored electrical signals;

c. weighting means for scaling the magnitudes of said plurality of predetermined frequency components according to selected scaling factors;

d. comparison means for comparing said scaled magnitudes from a first data acquisition period with the scaled magnitudes from a preceding data acquisition period; and e. detecting means for detecting the occurrence of a high impedance fault or arcing phenomenon on said electrical feeder line on the basis of said comparison.

An electrical isolation switch is also provided by the present invention for use in an electrical distribution system including at least one electrical feeder line for conveying AC electricity of a fundamental frequency, comprising:

a. monitoring means for monitoring electrical signals on said at least one electrical feeder line;

b. filtering means for isolating a plurality of predetermined frequency components from the monitored electrical signals;

c. weighting means for scaling the magnitudes of said plurality of predetermined frequency components according to selected scaling factors;

d. comparison means for comparing said scaled magnitudes from a first data acquisition period with the scaled magnitudes from a preceding data acquisition period;

e. detecting means to detect the possibility of a high impedance fault on said electrical feeder line on the basis of said comparison and to generate a trip signal if the possibility of a high impedance fault is so detected; and f. switching means to electrically isolate said at least one electrical feeder line from the source of said AC electricity upon generation of said trip signal.

The present invention also encompasses an electrical distribution system comprising:

a source of AC electricity of a fundamental frequency;

at least one electrical feeder line coupled to said source by way of switching means capable of electrically isolating said at least one electrical feeder line from said source upon receipt of a trip signal;

monitoring means for monitoring electrical signals on said at least one electrical feeder line;

filtering means for isolating a plurality of predetermined frequency components from the monitored electrical signals;

weighting means for scaling the magnitudes of said plurality of predetermined frequency components according to selected scaling factors; and comparison means for comparing said scaled magnitudes from a first data acquisition period with the scaled magnitudes from a preceding data acquisition period, and to issue a said trip signal to said switching means if said comparison indicates the possibility of a high impedance fault on said at least one electrical feeder line.

In order to more easily facilitate the comparison of the scaled magnitudes during sequential data acquisition periods the scaled magnitudes of the plurality of predetermined frequency components during each data acquisition period are preferably summed, and the sums of said scaled magnitudes are compared by said comparison means.

The apparatus provided by the present invention preferably includes a sample and hold device, a threshold device, and a summing means, whereby the scaling of the magnitude of a given predetermined frequency component may be conveniently achieved by determining and summing the number of times during a data acquisition period in which the sampled magnitude of the given frequency component exceeds a selected threshold, and multiplying the resulting sum by a scaling factor corresponding to said given frequency component. The summing and scaling of the predetermined frequency components may be conveniently carried out according to the following formula:

$$X = \sum_{i=1}^{n} W_i \left( \sum_{j=1}^{m} (S_{ij} > T_i) \right)$$

Where:

X is the weighted sum of the frequency components, n is the number of frequency components, $W_i$ is the scaling factor for the frequency components, m is the total number of samples during a data acquisition period, $S_{ij}$ is the sample magnitude for the frequency components, and $T_i$ is the individual threshold for each frequency component.

To enable a better understanding of the working of the present invention a preferred embodiment thereof is described in detail hereinafter, by way of example only, with reference to the accompanying drawing, wherein.

Figure 1:
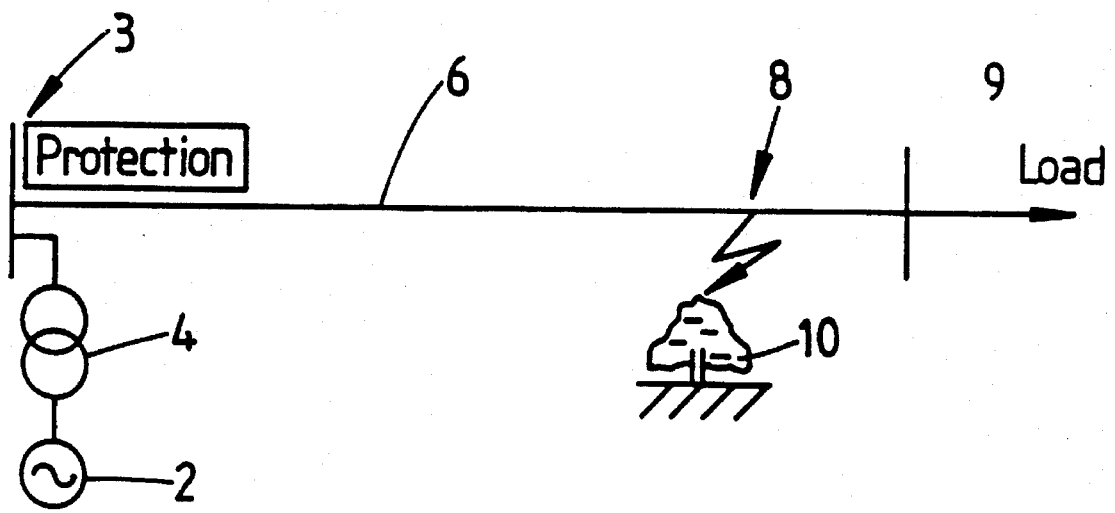
FIG. 1 shows a diagrammatic representation of a typical high impedance arcing fault.

FIG. 1 is a schematic diagram of a typical electrical distribution system 1 which may be affected by high impedance arcing faults. A source of AC electricity 2 is coupled through a transformer 4 and protection circuitry 3 to an electrical feeder line 6 which terminates at an electrical load 9. The feeder line 6 may typically be a three phase, three or four wire distribution feeder, or may comprise a single phase two or one wire line. As illustrated in FIG. 1, at some point along its length, the feeder line 6 is so close to a grounded high impedance object, such as a tree 10, that at least one wire of the feeder line 6 may to come into contact with the tree 10. This is indicated in FIG. 1 at a fault point 8, causing a high impedance fault between the feeder line 6 and the high impedance object 10, by virtue of an electrical arc therebetween. Because the arc currents in such faults are often quite small, such faults often escape tripping over current protection devices of the protection circuitry 3. However, even relatively small arcing currents can generate a large amount of localised heat build up, which may in turn result in an undesirable bushfire.

Detailed analysis of the electrical response of electrical distribution systems to arcs has revealed that signals of many different frequencies other than the fundamental frequency of the electrical system are generated during arcing. Tests have revealed that harmonic signals generally increase during the occurrence of a high impedance fault, and that the amount of increase of harmonic frequencies varies under different power system and fault conditions. For example, the harmonics generated by a high impedance arcing fault have been shown to be affected by physical and environmental variables such as feeder configuration, shapes of objects at the fault point, fault nature, load type and level, and prevailing weather.

The shape of objects at the fault point, such as tree or concrete road, is an important factor which affects harmonic content. If the fault point is sharp, it may result in point to point arcing, however if the shape is flat then arcing may result over a large surface area. These different types of arcing configurations have been shown to generate different levels of frequency signals.

Capacitor banks (not shown) which may be connected at one end of a feeder line can also affect the frequency signals detectable at the point of protection circuitry 3. High frequency signals, for example, can be shunted easily by capacitor banks, which present very low impedance to such high frequency signals. On the other hand, low frequency signals can pass capacitor banks much more easily.

Figure 2:
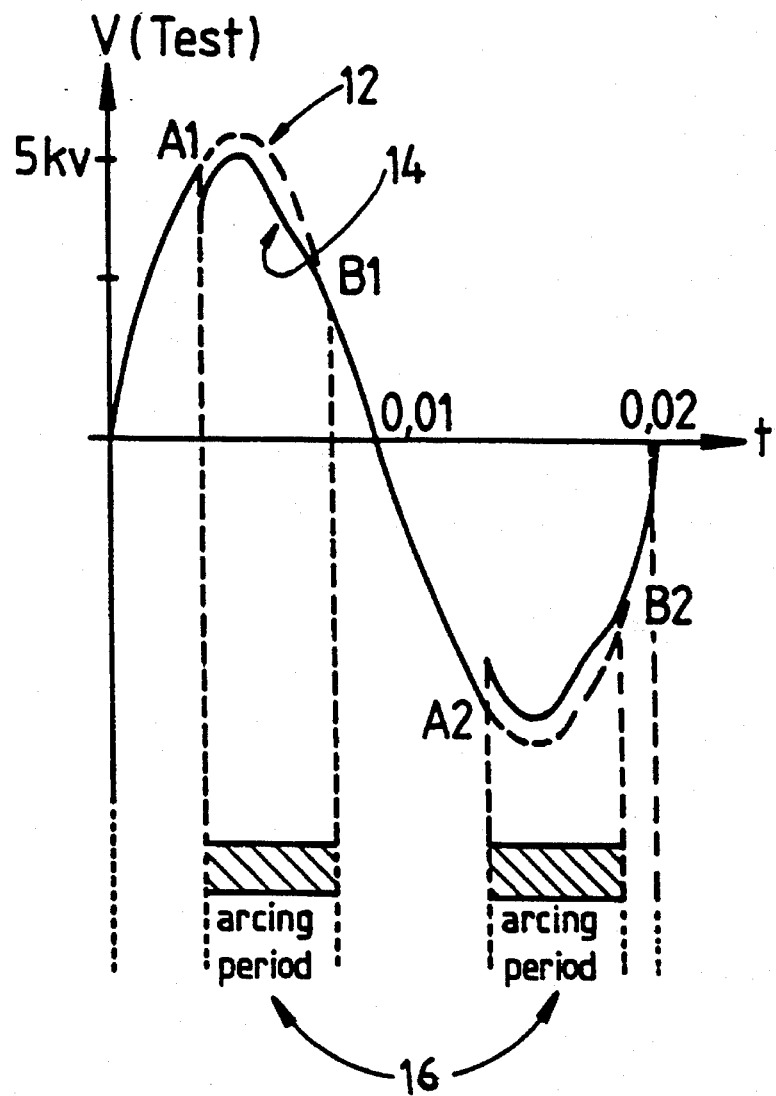
FIG. 2 illustrates a characteristic of high impedance arcing faults.

It has also been found that the frequency components which appear as a result of an arc appear only intermittently, modulated at twice the fundamental AC frequency. The cause for the intermittent nature of frequency components resulting from an electrical arc can be conveniently described with reference to FIG. 2. The waveform 12 illustrated in FIG. 2 shows a sinusoidal source voltage waveform which may be found in an electrical distribution system under normal operating conditions. The curve 14 shows the voltage waveform which occurs as a result of an arcing fault. As shown in FIG. 2, arcing begins at points A1 and A2 near the voltage peaks of the sinusoidal waveform, and cease at points B1 and B2 respectively, when the voltage becomes too low to sustain the arc. This results in two arcing periods 16 during which arcing current flows to ground, causing the feeder voltage to noticeably drop as can be seen in FIG. 2 where the curve 14 is lower than the corresponding curve 12. Arcing occurs twice for every single electrical cycle, resulting in a characteristic harmonic frequency which is twice the fundamental frequency.

In consideration of the above, the preferred embodiment of the present invention presents a system for detecting the presence of an arcing fault by utilising the electrical characteristics of such high impedance faults, namely the presence of a range of frequency components other than the fundamental frequency, and the intermittent nature of the presence of such frequency components during a high impedance fault. A group of frequency components for use by the preferred embodiment has been found in which the combination of detected components can realise a high accuracy of fault detection, in spite of the fact that each component when considered alone has drawbacks for detecting faults. In particular, the preferred embodiment determines the possibility of a high impedance arcing fault on the basis of eight signals, namely:

$V_0$: zero-sequence (50 Hz) voltage,
$V_2$: second harmonic (100 Hz) voltage,
$V_s$: eight harmonic (400 Hz) voltage,
$V_h$: high frequency (2 KHz–10 KHz) voltage,
$I_0$: zero-sequence (50 Hz) current,
$I_1$: low frequency (120 Hz–130 Hz) current,
$I_3$: third harmonic (150 Hz) current, and
$I_s$: eight harmonic (400 Hz) current, In order to distinguish between signals present during normal system operation and those resulting from arcing faults, the selected signals are based on frequency components which have been found to show a significant increase when arcing faults occur under a wide range of different system conditions. Four voltage signals and four current signals are used as the detection criteria in the preferred embodiment.

Zero sequence voltage and zero sequence current signals have traditionally been used as parameters to detect unbalanced faults. It has been found that these signals are not sufficient alone for detecting arcing faults, but can add valuable information to assist the final detection of an arcing fault in a four wire feeder. In a well balanced power system, zero sequence voltage and current may increase when arcing faults occur. Additionally, zero sequence voltage and current may be used to detect the direction or position of a fault by comparing the angle between two phases.

Low frequency signals ranging from 120 Hz to 130 Hz have also been found to be of significant importance in detecting arcing faults. The relative increase in the magnitude of signal frequencies in this range is large enough to be easily detected under arcing fault conditions, since these signal frequencies should be zero under normal operating conditions. Another advantage is that signals at these low frequencies will exhibit little attenuation from capacitor banks present in the distribution system.

A third harmonic current component is useful and a detection criteria, particularly if the distribution loads are connected in delta configuration and for three wire distribution circuits. Although the third harmonic current can exist in relatively high amplitudes even under normal system operating conditions, it has been found that the increase of the amplitude during an arcing fault is sufficient to assist detection.

Eighth harmonic voltage and current signals have also been found to increase remarkably during arcing faults. Traditionally, odd harmonics (third, fifth and so on) have been considered to be the best indicators for arc detection, since they are predominant in amplitude during arcing. However, tests leading to the construction of the preferred embodiment have unexpectedly shown that the relative amplitude increase of even harmonics, especially the eighth harmonic can be larger than the relative amplitude increase of many odd harmonics. This results in the eighth harmonic being one of the best indicators of arcing faults under all system conditions.

High frequency current components includes all signals in the range of approximately 2 kHz to about 10 kHz which exists in the protected power system. It has long been known that high frequency current signals, particularly above 2 kHz increases significantly under arcing conditions. A disadvantage of such high frequency signals is that they cannot generally propagate long distances (greater than about 20 miles), particularly through feeders provided with filtering capacitor banks.

The eight selected frequency components each perform differently during an arcing fault, although in general all of them exist and increase during an arcing fault. Furthermore, some frequency components may increase more in a first power system condition, whilst others increase more in a second system condition. For example, in a distribution power line provided with filtering capacitor banks, the amplitude of the second harmonic signal may be detected to increase relatively higher than the high harmonic signals which get easily shunted to ground through the capacitor banks. The preferred embodiment, therefore, employs scaling or weight factors for each signal, which may be altered depending upon the system conditions prevalent at the particular distribution feeder.

For example, in a feeder provided with shunting capacitor banks the weight or scaling value for the second harmonic signal should be set higher than the weight value of the high frequency signals, since the second harmonic signal will increase relatively greater during an arcing fault. The ability to change weights for the individual signals allows the high impedance fault detector to be adjusted according to the distribution system upon which it is to be employed. The adjustable weighting values in the preferred embodiment also enables the fault detector to be easily readjusted after installation, to adjust for alterations in the distribution system, or to provide an opportunity to improve the accuracy of detection by learning from the results of previous arcing faults.

Figure 3:
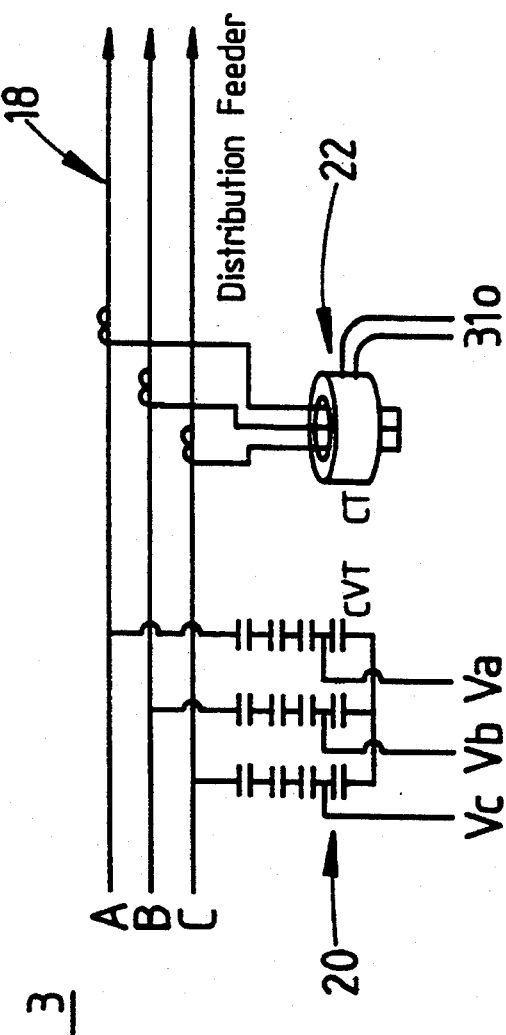
FIG. 3 illustrates sensing circuits of the preferred embodiment of the present invention.

FIG. 3 illustrates a typical three wire three phase distribution feeder 18, and the preferred arrangements for monitoring the voltage and current frequency components utilised by the preferred fault detector. A voltage monitoring circuit 20 comprising a three phase capacitor voltage transformer 21 senses voltage signals $V_a$, $V_b$ and $V_c$, whilst a current monitoring circuit 22 comprising a three phase current transformer 22 senses current signals in the three phase wires.

Figure 4:
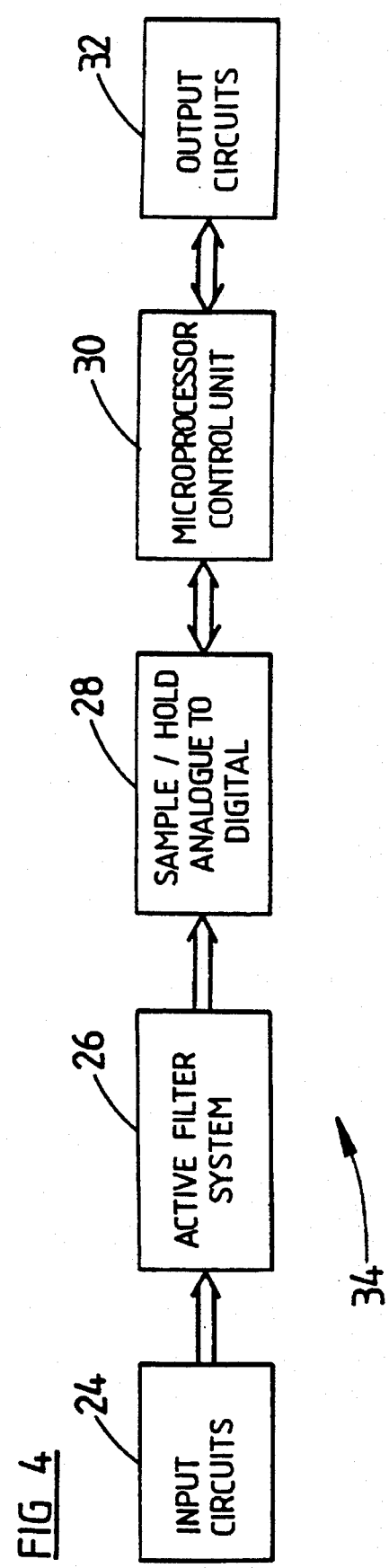
FIG. 4 shows a block diagram of the apparatus of the preferred embodiment.

FIG. 4 shows a block diagram of the preferred high impedance fault detector 34, which comprises five main components: input circuits 24, active filter system 26, digital processing circuitry 28, a micro processor control unit 30 and output circuits 32. The function of the fault detector 34 is to detect the presence of high impedance faults based on processing of received voltage and current input signals. In summary, signals are derived from the distribution feeder 18 by way of the voltage monitoring circuit 20 and current monitoring circuit 22, and are reduced to a level which is suitable for measurements. Frequency components are selected from the derived signals by individual filters of the active filter system 26, and are passed to the microprocessor control unit 30 after being sampled and digitally converted by the digital processing circuitry 28. Analysis of the input signals takes place in the microprocessor control unit 30, following a detection scheme which is explained in detail hereinafter. The results of the analysis is then utilised to operate a control system such as isolating relays by way of the output circuits 32.

The input circuits 24 of the detector 34 receive the voltage and current signals sensed by the voltage monitoring circuits 20, 22, and act to reduce the voltage and current signals to levels which can be comfortably handled by low voltage circuitry. The level of reduction may be accomplished by any convenient method, and in the preferred embodiment comprises step down transformers (not shown) and resistors (not shown) for the voltage signals, and for the current signals comprises a step down transformer (not shown) and an op-amp (not shown) coupled to convert current signals to more convenient voltage signals.

Figure 5:
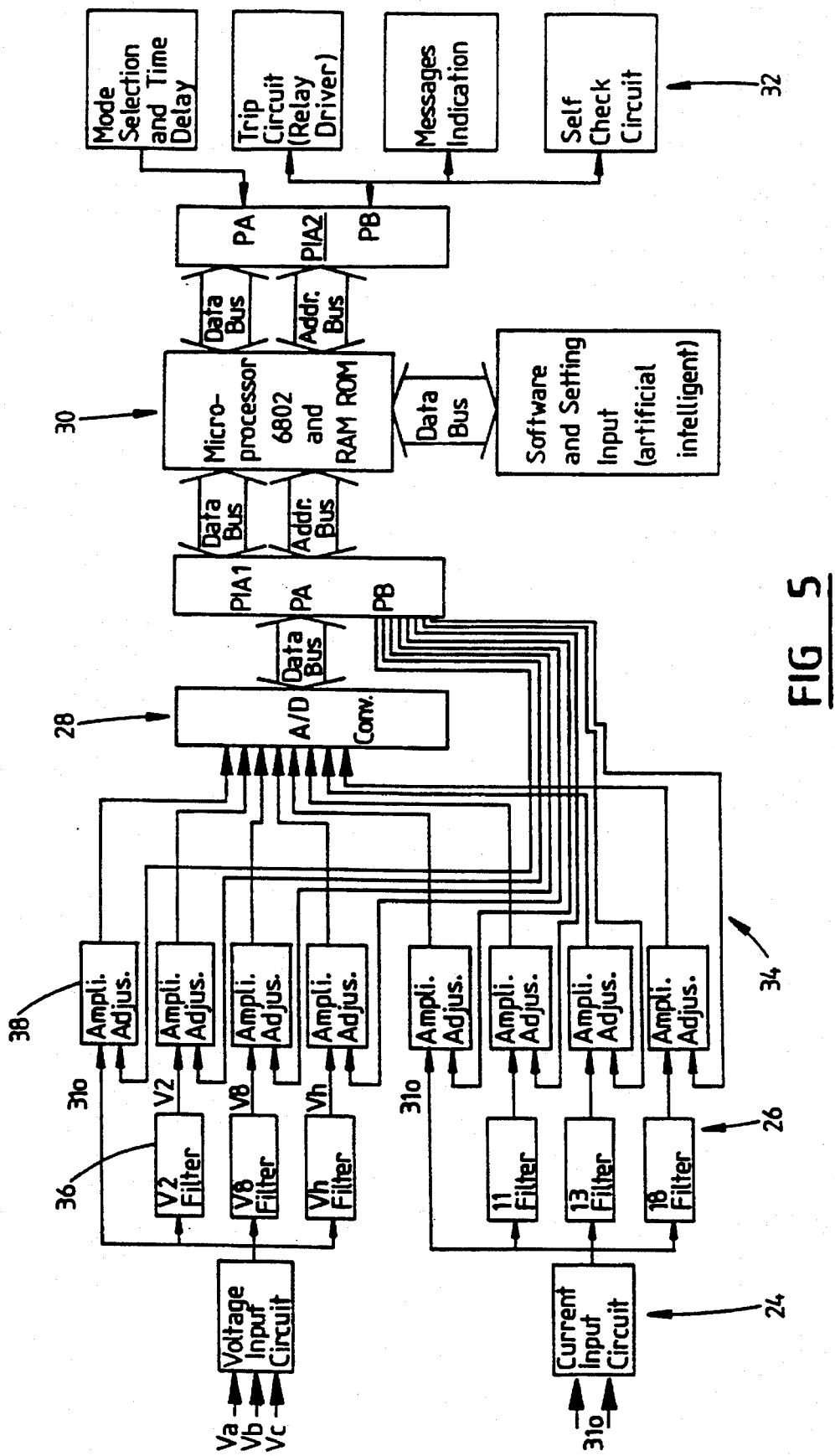
FIG. 5 shows a more detailed block diagram of the circuitry of the preferred embodiment.
Figure 6:
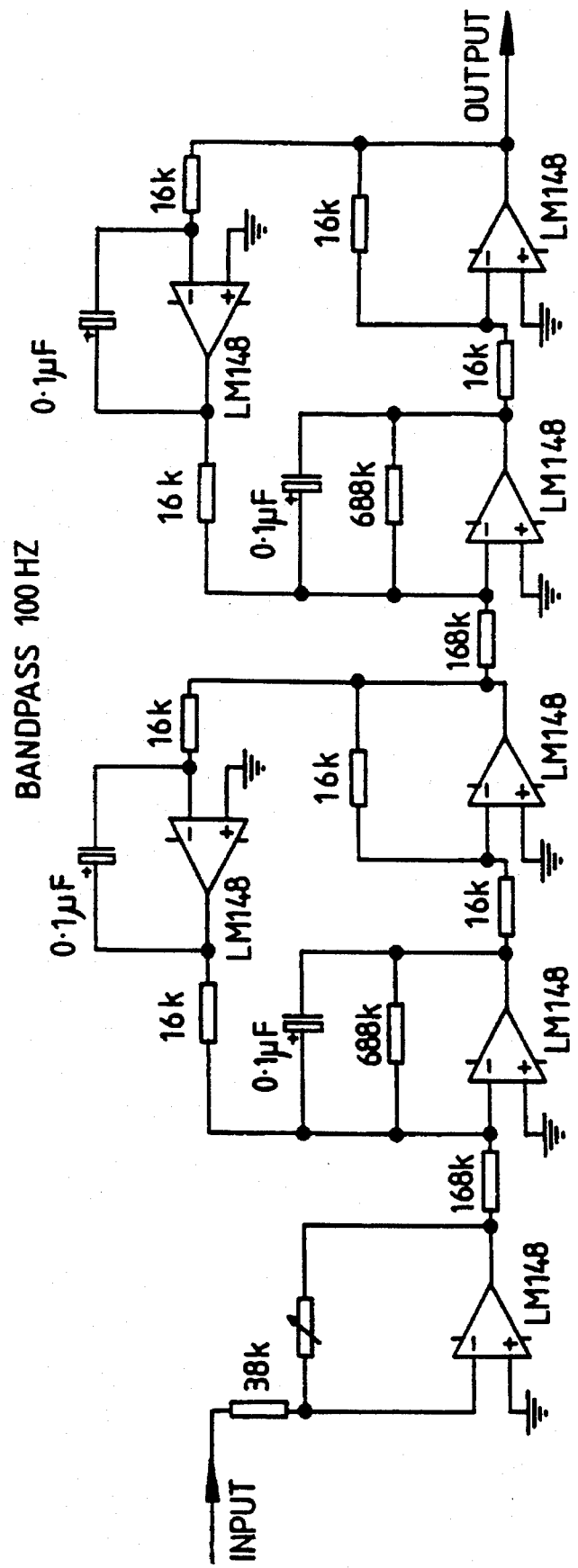
FIG. 6 illustrates an example of a filtering circuit of the preferred embodiment.

FIG. 5 shows a more detailed block diagram of the fault detector 34, illustrating the components of the active filter system 26. Each signal component, except the zero sequence components which are at the fundamental frequency, are selected by individual filters 36. FIG. 6 shows an example of a band pass filter 36 which is utilised in the preferred embodiment. The filter illustrated in FIG. 6 is a fourth-order band-pass Chebyshev cascaded biquad filter, which exhibits excellent tuning features, and is capable of obtaining Q factors of up to 100 or more. The individually filtered frequency components are then put through an amplitude adjustment stage 38, before passing to the digital processing stage 28. Although the analog filters utilised in the described embodiment perform well, digital filters may alternatively be used if required.

Figure 7:
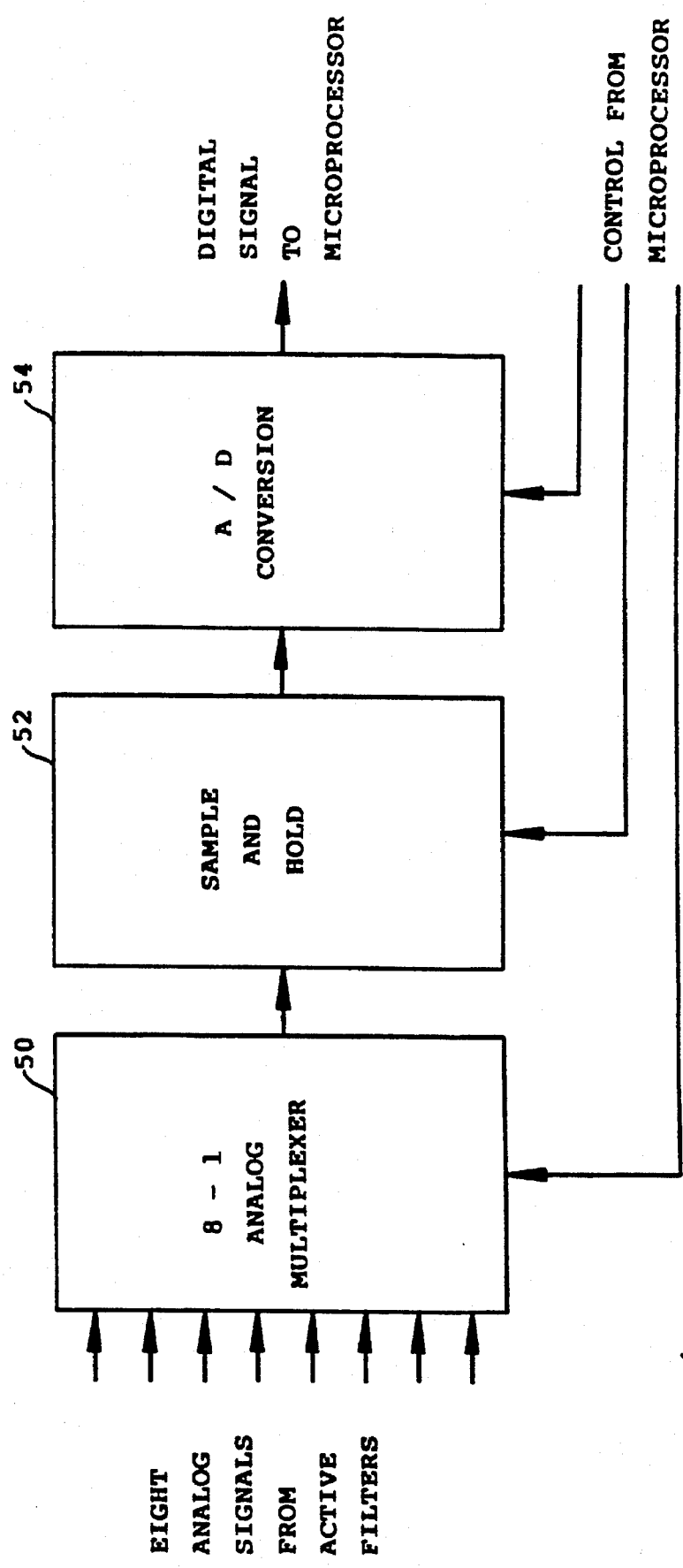
FIG. 7 illustrates sampling and digital conversion circuits.

FIG. 7 illustrates a block diagram of the digital processor 28 selected for the preferred embodiment, which is based on products ADC0808 or ADC0809 of the National Semiconductor Corporation. The eight analog frequency component signals from the active filters are inputted to an eight-to-one analog multiplexer 50 which is clocked by signals from the microprocessor controller 30. The signal output of the multiplexer 50 is passed to a sample-and-hold circuit 52, which samples the analog impulse signal and passes the sampled magnitude to an analog-to-digital conversion stage 4. The sampled analog signal magnitude is there converted to a digital number, which is passed to the microprocessor controller 30 for further processing and analysis.

Figure 8:
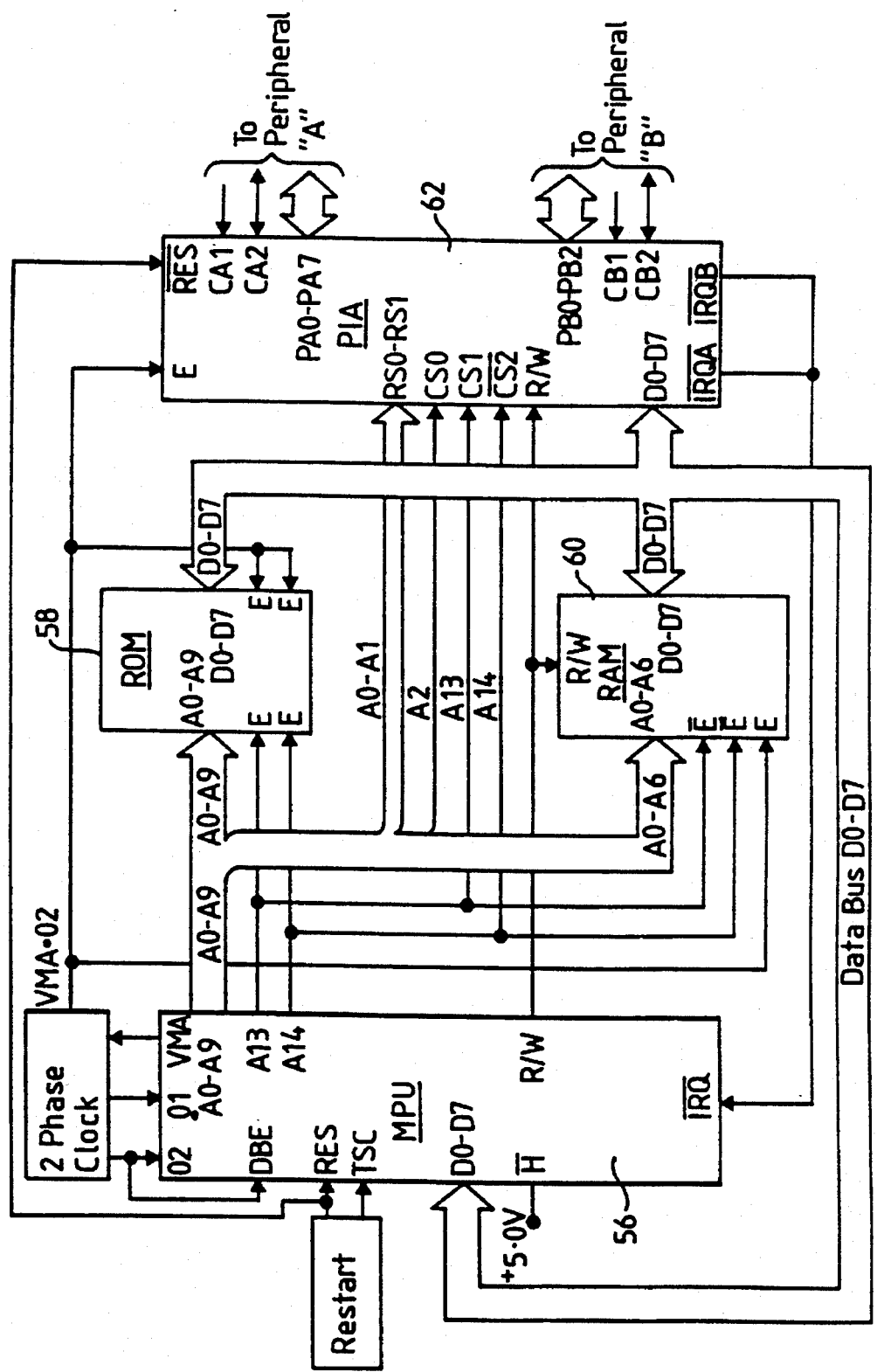
FIG. 8 illustrates a digital numeric processing arrangement for use in the preferred embodiment.

The microprocessor controller 30 is based upon a Motorola M6802 microprocessor 56 and a block diagram of the main components of the controller 30 is illustrated in FIG. 8. Briefly, the microprocessor 56 coupled to non-volatile memory 58 and read/write RAM memory 60, and also to a programmable input output port device 62. The digital processing and analysis procedures which are carried out on the digitised frequency component signal data by the microprocessor are stored as instructions in the non-volatile memory 58, whilst the RAM memory 60 is used for storing patterns indicative of the operational history of the distribution system. The programmable input output port 62 is used both to receive the digitised frequency component signals from the digital processor 28, and also to issue instructions to the output circuitry 32.

Figure 9:
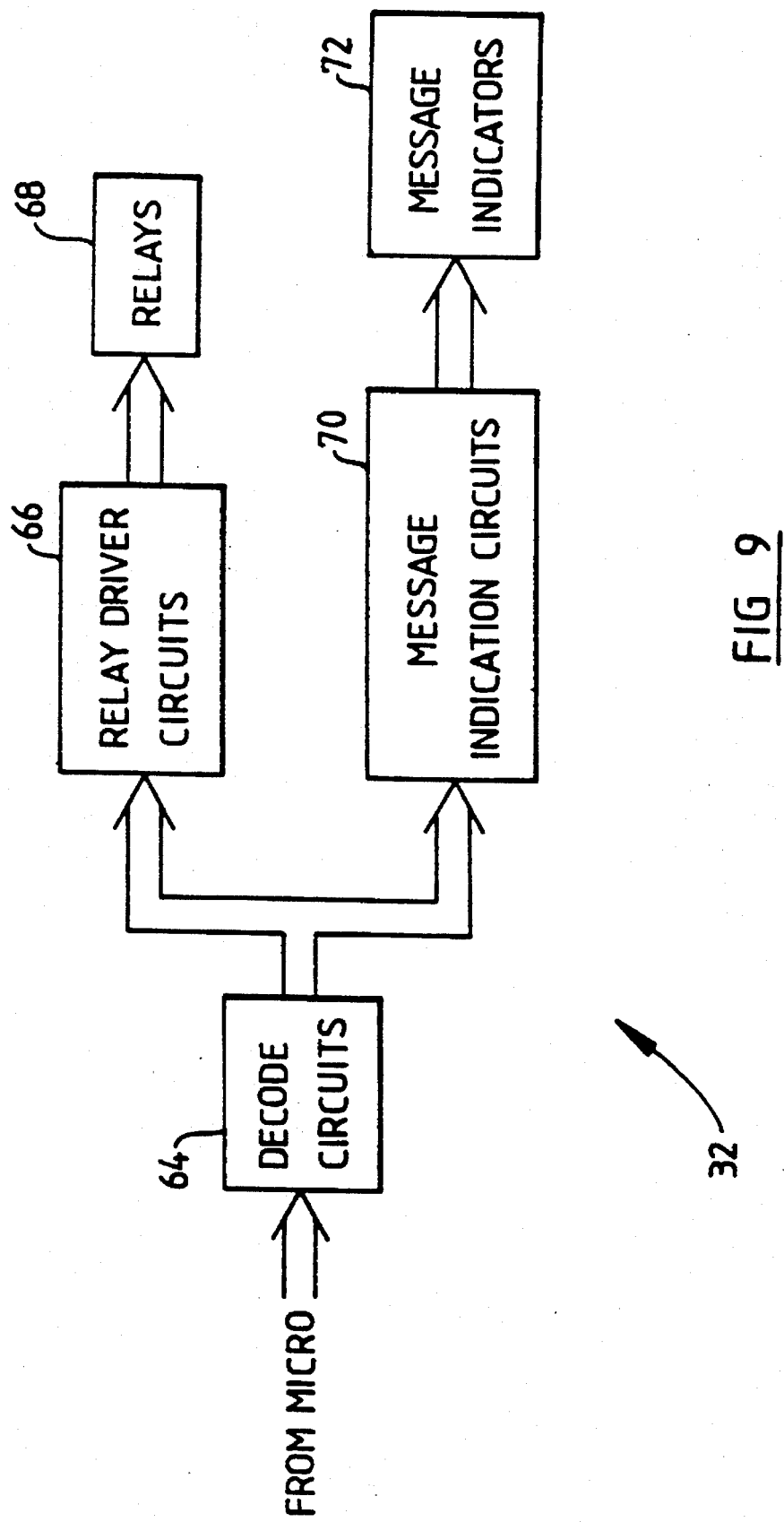
FIG. 9 is a block diagram of output circuits of the preferred embodiment.

After the input data have been analysed by the microprocessor, instructions may be issued to the output circuitry 32. The function of the output circuitry 32 is to link the microprocessor control system 30 with the control system in the electrical distribution sub-station, such as isolating relays for isolating faults on the relevant distribution feeders. A block diagram of the output circuitry 32 is illustrated in FIG. 9, which comprises decoding circuits 64, relay driver circuitry 66, and message indication circuits 70. The instructions from the microprocessor controller 30 are translated by the decoding circuits, which may provide messages to the operators of the distribution system by way of the message indication circuits 70 which may include indicator lights indicating normal or abnormal operation of the feeder line. When analysis of the input data indicates a high impedance arcing fault, the fault detector 34 is also able to trip the circuitry breaker or relay of the feeder by way of the relay driver circuits 66, in order to isolate the fault. The types of message indicators 72 which may be available include indications of: disturbance on the feeder; arcing disturbance on the feeder; high impedance fault; solid ground fault; and relay tripped.

The detection methodology of the preferred embodiment relies to a large extent upon the data processing which takes place in the microprocessor controller 30. The eight signals, $V_o$, $V_2$, $V_8$, $V_h$, $I_1$, $I_3$, $I_8$, and $I_0$, are sequentially selected using the eight channel multiplexer 50, following isolation by the active filter portion 26. The overall speed of the analog-to-digital conversion in the preferred embodiment is 10 kHz, which equates to 1.25 kHz for each of the eight signals. Further, a data acquisition period of 20 milliseconds is selected, which is equivalent to one period of the fundamental frequency (50 Hz) of the power system. Therefore, after the digital conversion, the microprocessor receives 200 samples (25 samples for each signal) during a given data acquisition period.

Figure 10:
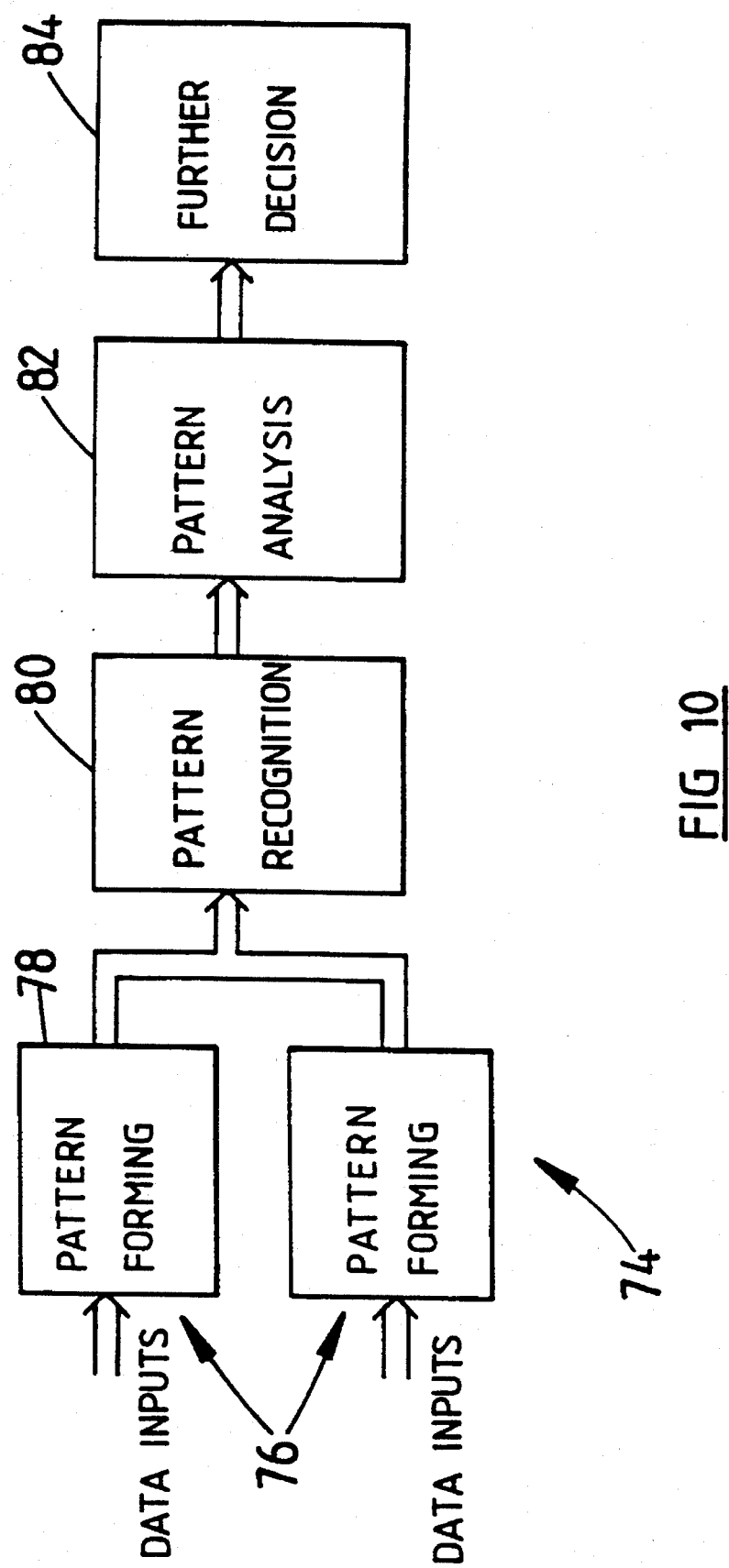
FIGS. 10 and 11 illustrate the use of pattern recognition in the preferred embodiment.

The data processing carried out in the microprocessor controller 30 follows a process of pattern forming, pattern recognition, and pattern analysis to detect a high impedance fault. This is illustrated in FIG. 10, which shows data inputs 76 resulting in pattern formations 78, which leads to pattern recognition 80 and pattern analysis 82 to enable a final decision at stage 84. The pattern formation stage 78 comprises scaling the individual samples according to the weighting factor corresponding to the frequency component signal from which the samples have been taken, and arranging the scaled samples of each signal in a respective chronologic formation. The arranged scaled samples comprise a pattern, and the formed pattern may then be stored in memory, and information about the distribution feeder can be updated by updating the patterns stored in memory. Each pattern contains information about the feeder during the corresponding data acquisition period. By continuously sampling the frequency component signals and forming and storing patterns characteristic thereof, the microprocessor controller 30 is able to continually update available information about the operating status of the feeder line. Since only a limited number of patterns can be stored in memory at any one time, past history patterns may be overwritten by more recent patterns.

Figure 11:
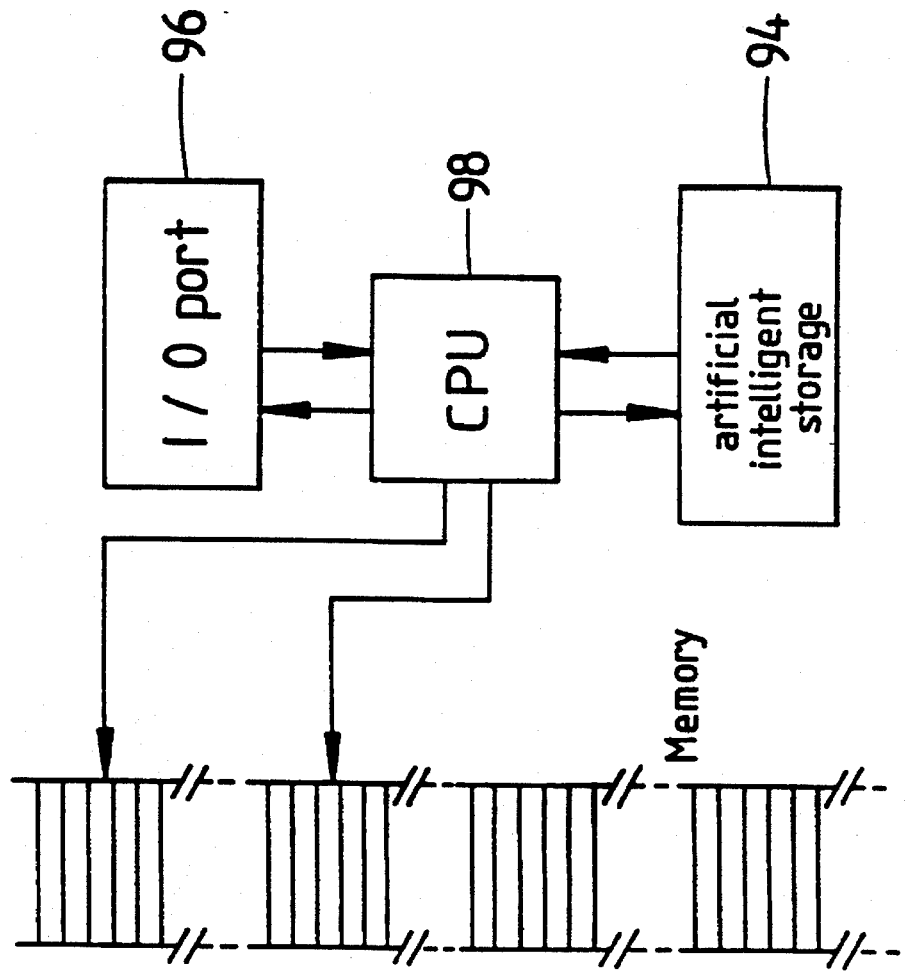

FIG. 11 illustrates a block diagram of a pattern storage memory, accessible by a CPU 98, and containing four pattern storage areas 86, 88, 90 and 92, labelled pattern No. 1 to pattern No. 4. The pattern recognition stage 80 involves the comparison of patterns stored in one or more of storage sections 86 to 92 containing sequential patterns, to determine the extent of change of the frequency component signals over a period of time.

The pattern analysis stage 82 of the detection methodology involves the analysis of each pattern by examining whether signals represented exist intermittently, which is indicative of arcing.

Figure 13:
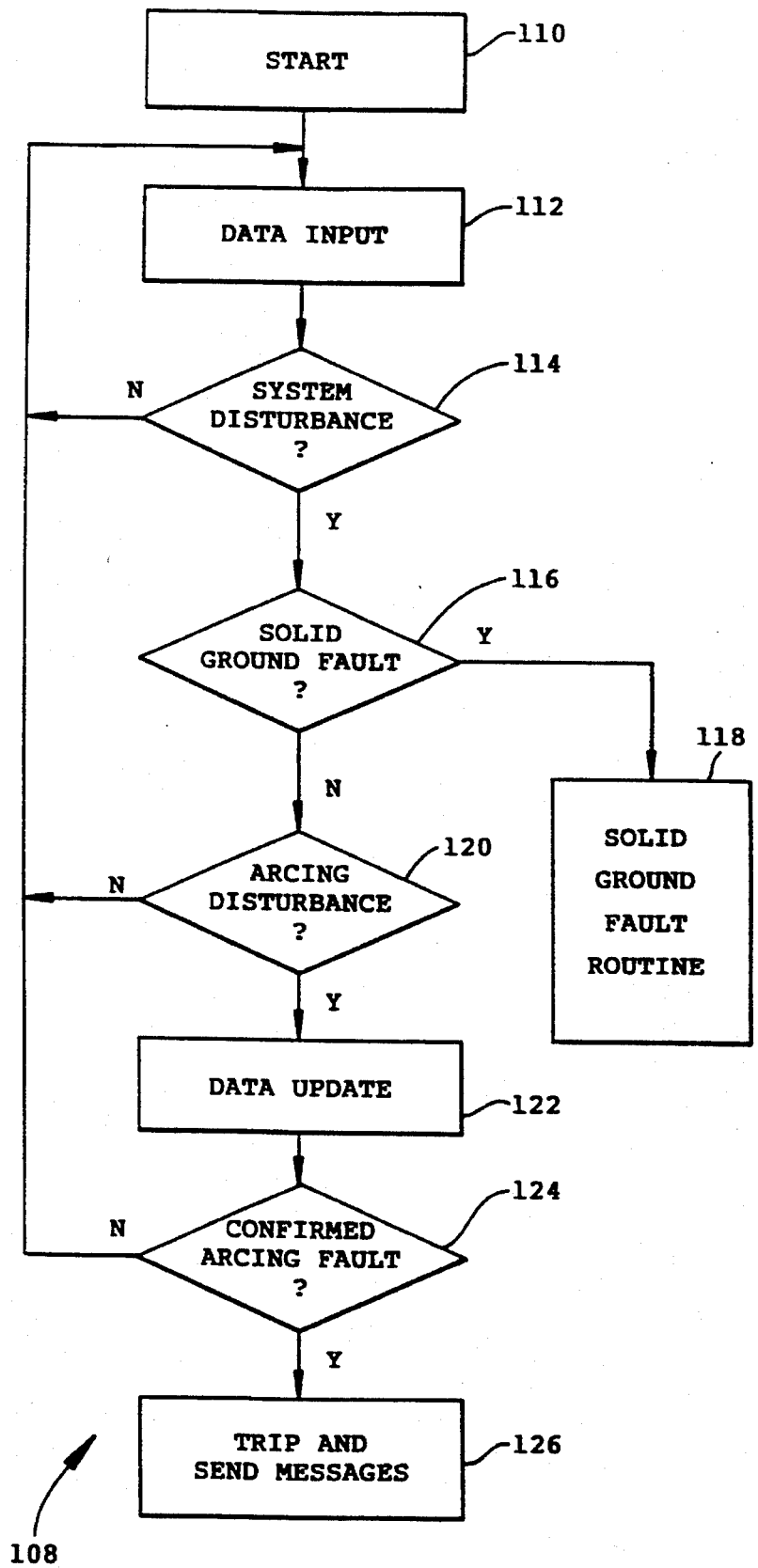
FIG. 13 is a simplified flow chart illustrating the process utilised by the preferred embodiment.

The process of detection can be divided into several sub-processes, and a simplified flow chart 108 of the detection process is illustrated in FIG. 13. Basically, the detection system keeps updating the information about the protected feeder, by comparing newly acquired data with the preceding data, as illustrated schematically in FIG. 11. When an arcing fault occurs on the distribution feeder the detection scheme of the preferred embodiment will detect a disturbance first, and then with further processing determine whether the disturbance is a fault.

The preferred detection system can also accurately detect solid ground faults, such as line to ground faults and double line to ground faults, which are more serious in terms of the severity of the fault currents and should be disconnected immediately. These type of faults are considered first, to enable them to be detected and cleared quickly. High impedance faults have low levels of fault current, and can be tolerated by distribution systems for a few seconds.

To avoid misunderstanding, the term disturbance is chosen to describe an normal situation on a distribution feeder before the situation is confirmed as a fault. That is to say that a ground fault can be detected first as a disturbance, and then can be confirmed as either a solid ground fault or a high impedance fault.

A key process in the detection of a disturbance by the preferred embodiment is to compare two patterns formed before and during the occurrence of a high impedance fault. Data is sequentially sampled in groups of 25 samples per signal, and formed in patterns. During detection, first and second patterns are sampled and formed in a sequence, and comparison of the second pattern with the first takes place. The result of this comparison or pattern recognition determines whether the system has been disturbed.

A pattern threshold is used for measuring the difference between patterns. If the difference between the two patterns is larger than the pattern threshold, a disturbance is indicated since the change of patterns is too large. If the difference is small, then this indicates acceptable fluctuations in the normal operating condition of the feeder. The first of the patterns is then erased and the second pattern will take the position of the first pattern. Then a new pattern will be sampled and placed at the position previously occupied by the second pattern. With reference to FIG. 11, the oldest stored pattern is referred to as pattern No. 1, with sequentially newer patterns stored as patterns Nos. 2 to 4. The same routine of comparison of pattern No. 1 with pattern No. 2 then again takes place.

Figure 12:
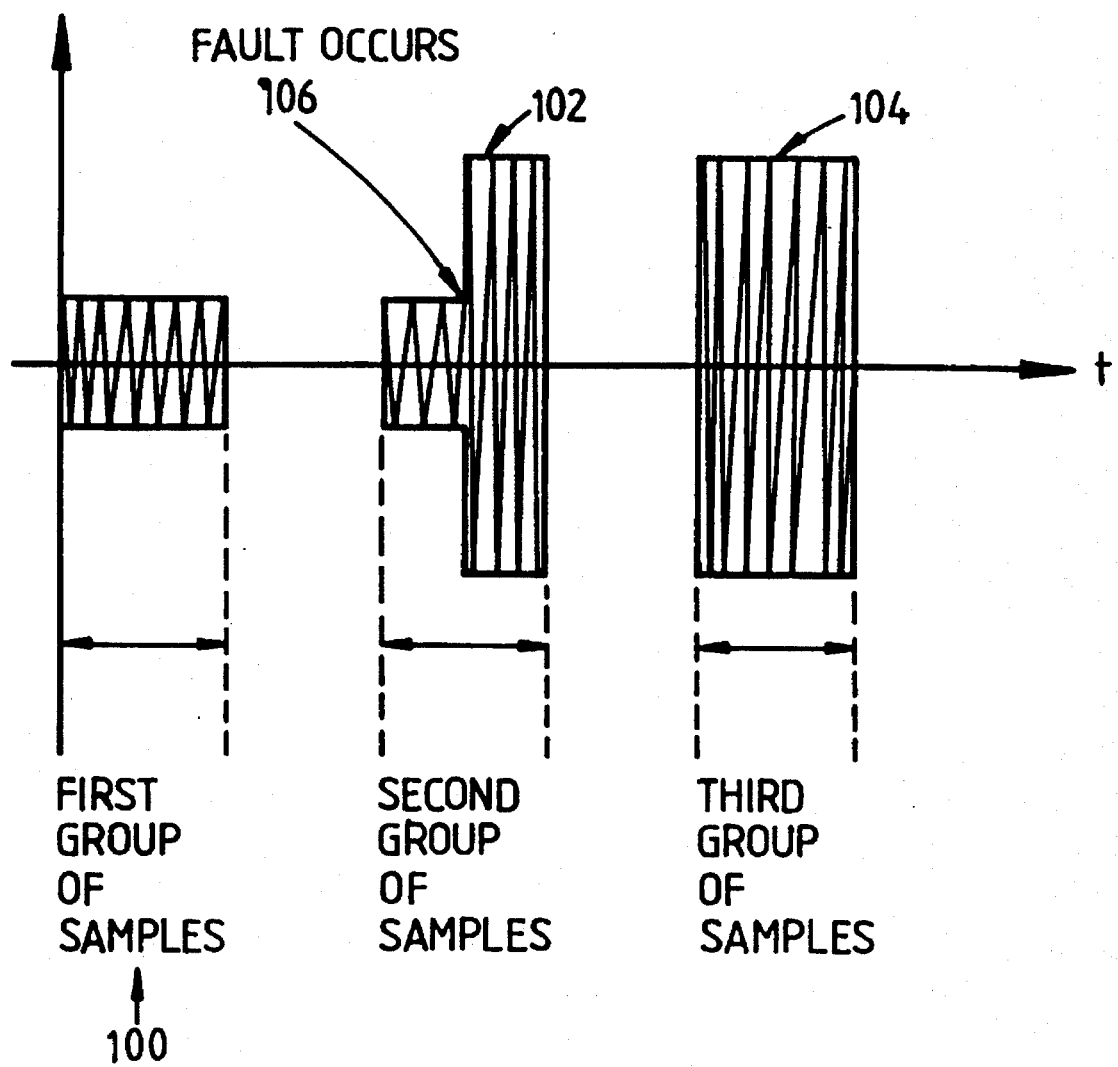
FIG. 12 shows an example of sampled waveforms during an arcing fault.

The determination of a value for the pattern threshold can be difficult. A disturbance can happen at any time in a pattern forming process while the microprocessor is sampling. If a disturbance occurs in the middle of pattern No. 2 as shown in FIG. 12, the differences between pattern No. 2 and pattern No. 1 or pattern No. 3 and pattern No. 2 are all very small. To tell the difference properly, the threshold should be very small. However, using such a small threshold can result in a false trip of the fault detector where the threshold is exceeded by detection of noise under normal operating conditions without a disturbance.

Figure 15A:
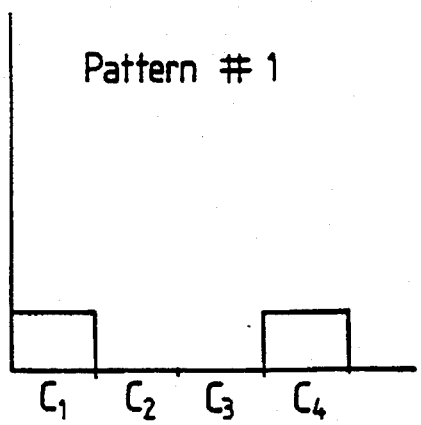
FIGS. 15a to 15f illustrate an exemplarily diagrammatic pattern comparison process for the fault situation illustrated in FIG. 12.
Figure 15B:
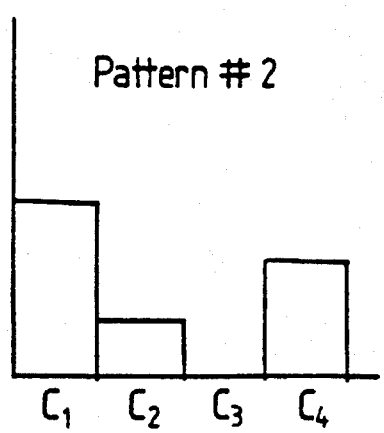
Figure 15C:
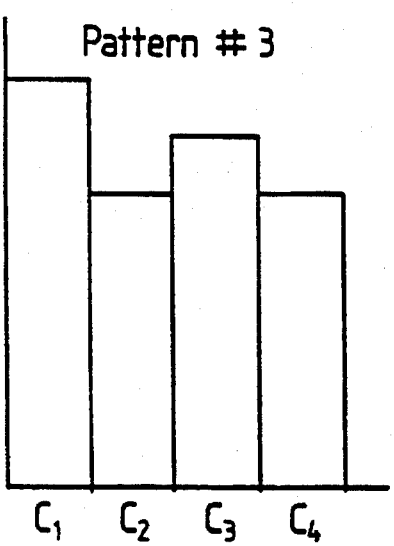
Figure 15D:
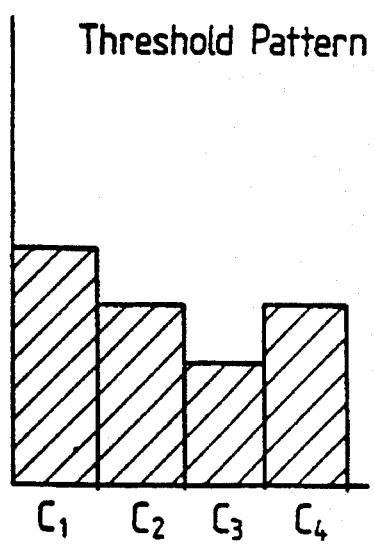
Figure 15E:
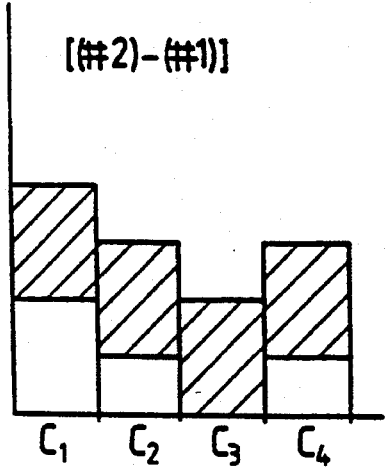
Figure 15F:
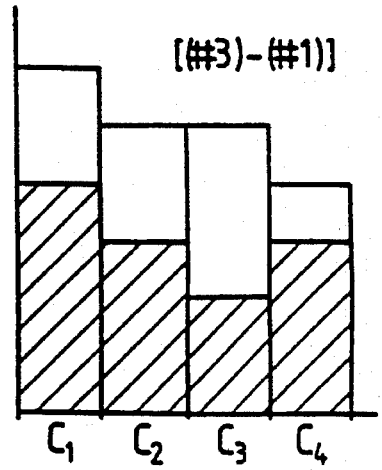

FIGS. 15a to 15f illustrate diagrammatically an example of a pattern comparison process for the situation illustrated in FIG. 12 where an arcing fault occurs during the data acquisition period of pattern No. 2. For the purposes of illustration, each pattern is formed from 4 frequency components ($C_1$, $C_2$, $C_3$, and $C_4$) with the height of each component representing a measure of the magnitude of the corresponding electrical signal frequency component in the distribution system during the data acquisition period for the pattern. FIGS. 15a, 15b and 15c illustrate respective patterns formed during the data acquisition periods 100, 102 and 104 of FIG. 12. FIG. 15d illustrates a threshold pattern for the particular distribution system. The threshold pattern is set to indicate a system disturbance in the event that two measured patterns differ by an amount greater than the threshold pattern. FIG. 15e illustrates the difference between patterns 2 and 1 as compared with the threshold pattern, which illustrates that no disturbance would be found in this measurement. FIG. 15f, on the other hand, illustrates the difference between pattern 3 and 1 as compared with the threshold pattern which illustrates that in this case a system disturbance is indicated. A suitable measure of the magnitude of the electrical signal frequency components, for the purposes of forming the patterns, involves tallying the number of samples of a frequency component which exceeds an individually set threshold for that frequency component, as described in greater detail hereinafter. Clearly in a pattern comparison of the form illustrated in FIG. 15, the weighting or scaling factors need not necessarily be applied to the measured pattern components, since this scaling can be accounted for in setting the threshold pattern.

To avoid mal-operation of the protection system, pattern No. 3 as shown in FIG. 12 is also examined by the microprocessor controller 30. This group of samples helps the microprocessor to make sure whether or not a disturbance has occurred. Therefore two pattern thresholds, a Low Pattern Threshold and a High Pattern Threshold are required, and three groups of samples are used for finding a disturbance. With reference to FIG. 12, the High Pattern Threshold is used in comparing the difference between pattern No. 3 and pattern No. 1, and the Low Pattern Threshold is used in comparing the difference between pattern No. 2 and pattern No. 1.

The use of two pattern thresholds results in higher precision and reliability for the detection scheme. The value for the Low Pattern Threshold can be set low enough so as to not miss a small disturbance which may occur during a high impedance fault. The value for the High Pattern Threshold can be set high enough to make sure proper reliability is achieved in not detecting non-fault related fluctuations. Very small disturbances which are not caused by a power system fault will not pass this stage.

The High Pattern Threshold is used to check a disturbance detected, by the Low Pattern Threshold. Pattern No.3 illustrated in FIG. 12 is sampled totally during a disturbance situation, which occurs during the time when pattern No. 2 is still in processing. The High Pattern Threshold which is used to measure the difference of Pattern No. 3 and Pattern No. 1 can be set relatively high and this high value is able to stop detection of very low levels and small duration noise value (less than one cycle). Therefore, the combination of the two thresholds give both high precision and reliability for this first step of detecting a disturbance.

In fact, the first step may be considered as two parts. A small noise which can overcome the Low Pattern Threshold and cannot overcome the High Pattern Threshold is named an event, and a large noise which can overcome both thresholds, is called a disturbance. Event detection and disturbance detection are the two parts of the first step of detection utilised in the preferred embodiment.

The second step of detection is the pattern analysis. As mentioned above, the use of the analysis of the intermittent nature of an arc can improve the detection of an arc. In other words, the existence of an arc can be confirmed after the pattern has been analysed.

The reason for this can be stated as follows. If the noise has been found as disturbance using multiple parameter detection and the arcing nature has been found using pattern analysis, the noise must have come from an arc. There is nothing but an arc that can create frequency component noise with the periodic characteristic where multiple frequency parameters are detected to be on and off under a certain frequency rate (100 Hz), as is discussed above.

A further difficulty encountered in detecting high impedance arcing faults is that an arc which is detected by the system is not always related to an arcing fault. The two steps of detection explained above confirm the existence of an arc in the protected feeder. However, the arc does not always occur as a result of a high impedance fault, since other non-detrimental conditions exist which lead to arc generation in power systems. For example, operations in power systems such as switching on or off of circuit breakers can also provide arcs which are detectable in the distribution system. This means that a detected arc needs to be confirmed as resulting from a fault, and this constitutes the third step of the detection scheme. An arc in the power system is called an arcing disturbance before it is confirmed by the detection system.

The method used to tell the difference between an arcing fault and an arcing disturbance is based on introducing a time delay. Normally, an arc caused by normal system operations lasts only a short time because modern circuit breakers in particular work very fast. For example, an arc between two points in a circuit breaker may last less than 0.1 second. In contrast, an arc from an arcing fault will last much longer than that. Further, an arc on a high impedance object may last more than several seconds, even minutes before it develops into a hazard such as bush fire. There is no need for protection action if an arcing fault is able to quickly self-clear without circuit breaking intervention. A short time delay in the detection scheme can also be tolerated by power systems because of the low magnitudes of arcing high impedance fault currents. Arcing faults cause low level current, which does not ordinarily affect power system stability. Finally, the fault can be detected by the ground fault detection relays if the arcing current is high.

The primary idea of confirming a high impedance fault is simple. By processing more samples and forming a new pattern after a time delay, the microprocessor can compare the updated pattern with pattern No. 1 which is the only one sampled before the fault. The previously discussed method of pattern recognition is used for the comparison, and pattern analysis is used to analyse the new pattern. The result of these comparisons can answer whether the arcing fault still exists on the feeder after the introduced time delay. The trip instruction may be issued if the answer is confirmed.

However, the unstable nature of an arcing fault makes the confirmation process difficult. A large arcing current may change to small or even stop for several cycles because of the wind or the movement of arcing points. If samples are introduced at this time, the confirmation of the fault will fail. Of course, for the situation where the arc can stop by itself and remain off permanently, no tripping is the right choice. For the situation where the arc persists with an unstable burning nature a failure of confirmation should be avoided.

Confirmation of a high impedance fault becomes complete when two new patterns can be formed and used to confirm the existence of an arcing fault. They will not take more time for the confirmation because the microprocessor has to wait during the time delay. So the whole time delay can be divided into two, at the end of the first half of the delay the system performs one confirmation operation, and another confirmation operation is performed after the whole time delay. A suitable total time delay is 2 seconds.

Solid ground faults such as line to ground and double line to ground faults have relatively large fault currents compared to high impedance fault currents. They can be detected easily since zero sequence current Io will increase high enough to be easily detected. Solid ground faults can be detected relatively quickly. In order to achieve this, checking the occurrence of a solid ground fault has the highest priority in the detection scheme. In other words, in the microprocessor procedures the detection of occurrence of a solid ground fault is designated just after each new pattern is formed. A solid ground fault therefore can be detected quickly. To produce each pattern, the microprocessor needs 0.02 second. In a normal detection routine, the microprocessor samples continuously without a time delay except a very little time for performing the instructions. The time for performing the instructions takes a few millisecond which can be neglected compared to 0.02 seconds. Therefore a solid ground fault can be noticed by the microprocessor in about 0.02 seconds. The time for the system to trip depends on the detection scheme used.

Solid ground faults which develop from arcing faults can also be detected easily. In some cases, a fault starts with an arc which initially presents a high impedance fault and then it develops into a solid ground fault. By continuously checking the most up to date patterns, this kind of fault can be detected. This is an additional feature incorporated in the preferred embodiment high impedance fault detection scheme.

The time to respond to a developing ground fault varies from 0.02 second onwards. If the development of a fault has finished before the program starts the arcing fault confirmation routine, the fault will be detected in about 0.02 second. If the development finishes after that, the fault will be detected quicker, because during the confirmation routine the microprocessor has more free time to handle this.

In terms of time delay, the effect of solid ground fault detection on high impedance fault detection can be neglected. During high impedance faults, the final trip instruction will not be issued until four or five patterns are sampled. After each pattern is sampled, a quick check for the solid ground fault takes place. It takes only several milliseconds for each quick check, and so has almost no effect on a high impedance fault detection in terms of time delay.

A simplified methodology for performing the pattern recognition portion of the detection system involves combining the weighted data forming a pattern into a single weighted sum of frequency components. Individual thresholds $T_i$ may be set for each frequency components to isolate the signal samples which exceed the relevant threshold. The number of samples of a particular frequency component signal which exceed the given threshold during a data acquisition period may be utilised by the microprocessor controller 30 as a measure of the magnitude of that frequency component. If the number of samples of each signal exceeding the individual thresholds is then scaled by a weighting factor and combined with the weighted samples of the other frequency components then a single quantity is obtained which is characteristic of the weighted magnitudes of the examined frequency component signals. This single quantity may be easily compared with quantities obtained during other data acquisition periods to perform the pattern recognition function described above. The summing and scaling of the predetermined frequency components may be conveniently carried out according to the following formula:

$$X = \sum_{i=1}^{n} W_i \left( \sum_{j=1}^{m} (S_{ij} > T_i) \right)$$

Where:

X is the weighted sum of the frequency components n is the number of frequency components $W_i$ is the scaling factor for the frequency components m is the total number of samples during a data acquisition period $S_{ij}$ is the sample magnitude for the frequency components $T_i$ is the individual threshold for each frequency component.

With reference then to flow chart 108 illustrated in FIG. 13, the detection methodology carried out by the microprocessor controller 30 begins at step 110, and at step 112 the frequency component signals are sampled over a data acquisition period. The data obtained may then be stored in memory either as individual weighted frequency component signals, or as a weighted sum of components as described above. A system disturbance is detected at step 114, either by comparison of the pattern data obtained at step 112 with pre-stored standard pattern data, or by comparison with pattern data obtained in the immediately preceding data acquisition period. If the magnitude of the zero sequence signals indicates a solid ground fault at step 116, then the procedure continues to step 118 where the solid ground fault may be confirmed and action taken to isolate the fault. If a solid ground fault is not indicated the procedure continues to step 120 where pattern analysis is carried out on the data obtained at step 112 to confirm whether the system disturbance detected at step 114 is in fact attributable to an electrical arc. If an arc is confirmed at step 120 then data samples are again taken during a further data acquisition period (step 122). A comparison of the pattern of data obtained at step 112 and that obtained at step 122 may then confirm an arcing fault (step 124) in which case appropriate message signals and trip signals are issued at step 126.

Figure 14:
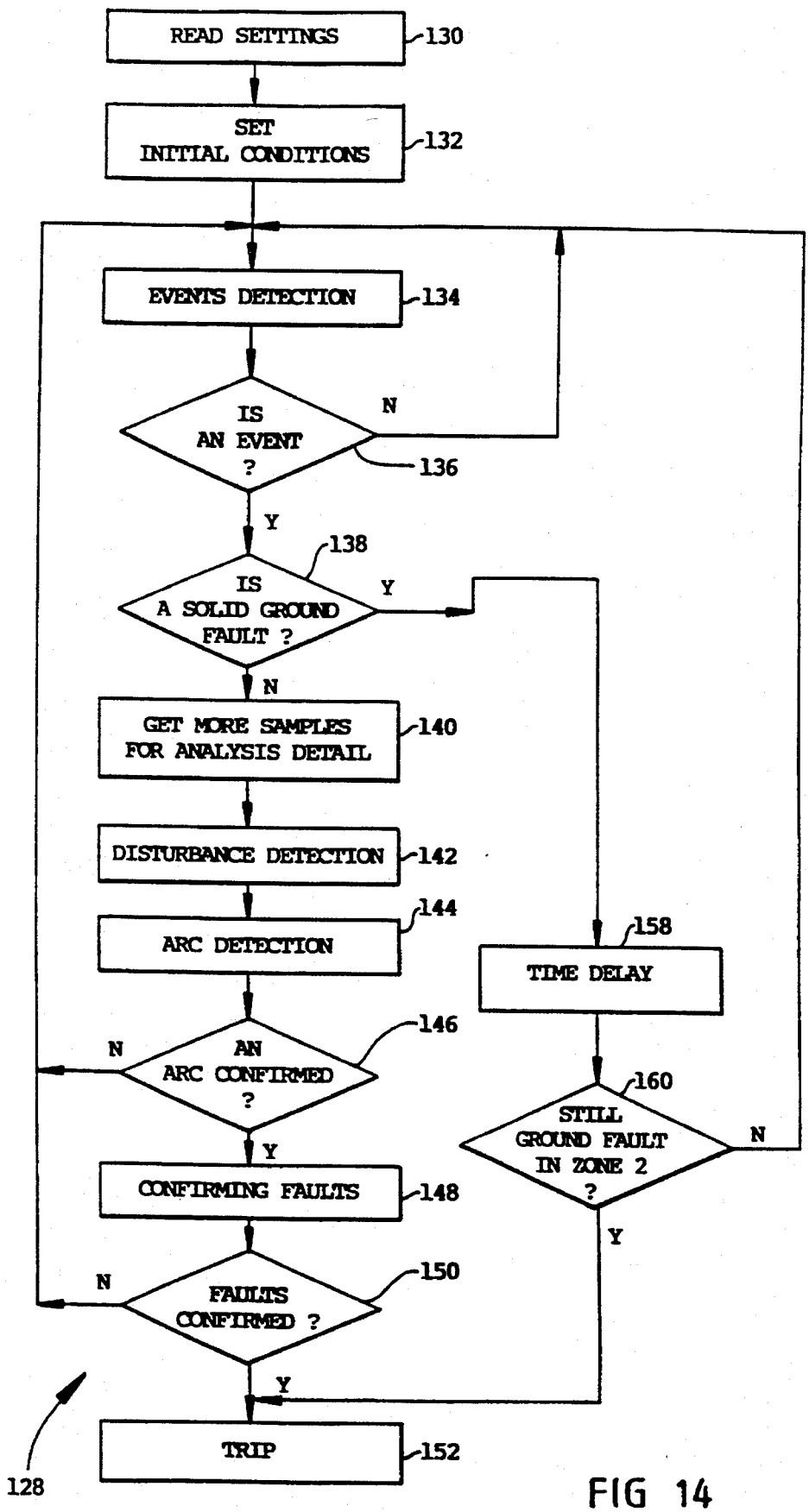
FIG. 14 is a more detailed flow chart of the process flow chart illustrated in FIG. 13.

Flowchart 128 illustrated in FIG. 14 represents a slightly more complex detection procedure which utilises the Low Pattern and High Pattern thresholds. Steps 130 and 132 represent the initialisation steps of the procedure where parameters such as the individual signal thresholds are retrieved and weight or scaling factors for each signal are determined. At step 134 it is determined whether an event has taken place in the distribution system by comparison of two sequential data acquisition period patterns with the low pattern threshold. If an event is determined (step 136) the procedure continues to step 138, or else the procedure continues to monitor for an event at step 134. Once an event has been detected (step 136) the occurrence of a solid ground fault is checked at step 138. In the event of a solid ground fault a time delay is introduced (step 158) and the ground fault is confirmed or denied at step 160.

If the detected event (step 136) does not result from a solid ground fault then further samples are obtained (step 140) to enable detection of an arc disturbance in steps 142 to 146. Having confirmed that the disturbance is due to an electrical arc a fault condition is confirmed at step 150, which results in the generation of relevant trip signals to isolate the fault from the electrical distribution system (step 152).

In appendix A there is shown an example of weights, thresholds and amplitude adjustment scales which have been successful in tests on a three wire three phase distribution system. It must be born in mind, however, that the weights indicated are by way of example only, and can be adjusted according to experience from the individual power system. Ranges of relative component weights which have proved successful in practice are as follows:

| $V_0$ | $I_0$ | $I_2$ | $I_3$ | $I_8$ | $V_2$ | $V_8$ | $V_H$ |
|---|---|---|---|---|---|---|---|
| 0–10 | 0–10 | 15–25 | 10–20 | 10–20 | 15–25 | 10–20 | 5–10 |

In addition, by changing the weight for each signal, the detection scheme has the ability of learning. The weight values can be set for each protection relay initially according to the previous experience of the utility including data collected during previous arcing faults, and can be readjusted periodically. This ability of learning provides an opportunity to improve the accuracy of the detection. The weight can be adjusted to suit a given utility condition without the need for changing the hardware, since such changes can be implemented in software.

Tabulated and described herein below are the results of a field test of arcing fault detection apparatus utilising the simplified methodology of the preferred embodiment of the invention. The first step of the test involved monitoring and sampling the prescribed eight signal components on an electrical feeder line during normal operation. An electrical fault condition was then induced in the feeder line by severing a cable and laying the severed cable end on an asphalt surface, this taking place with the electrical supply disconnected. Monitoring and sampling was again commenced, and continued whilst the electrical supply was reconnected to induce an arcing fault condition. Monitoring, sampling and processing of the signal components continued during the arcing fault until an isolating relay was tripped following confirmation of an arcing fault by the detection apparatus.

Shown below are the maximum voltage and current levels of the signal components before the fault condition, and the samples thereof recorded during a corresponding data acquisition period.

| | Maximum Values of Signal Components (Before Fault) | | | | | | |
|---|---|---|---|---|---|---|---|
| $V_0$ | $I_0$ | $I_L$ | $I_3$ | $I_8$ | $V_2$ | $V_8$ | $V_H$ |
| (volts) | (mA) | (mA) | (mA) | (mA) | (mV) | (mV) | (mV) |
| 0.0 | 0 | 0 | 0.3 | 0 | 0.1 | 0 | 0 |

| | | | Digitised Samples Before Fault (Hex) | | | | | |
|---|---|---|---|---|---|---|---|---|
| $V_0$ | $I_0$ | $I_L$ | $I_3$ | $I_8$ | $V_2$ | $V_8$ | $V_H$ | Sample No. |
| 00 | 00 | 00 | 00 | 00 | 00 | 00 | 00 | 1 |
| 00 | 00 | 00 | 00 | 00 | 00 | 00 | 00 | 2 |
| 00 | 00 | 00 | 00 | 00 | 00 | 00 | 00 | 3 |
| 00 | 00 | 00 | 00 | 00 | 00 | 00 | 00 | 4 |
| 00 | 00 | 00 | 00 | 00 | 00 | 00 | 00 | 5 |
| 00 | 00 | 00 | 00 | 00 | 00 | 00 | 00 | 6 |
| 00 | 00 | 00 | 00 | 00 | 00 | 00 | 00 | 7 |
| 00 | 00 | 00 | 00 | 00 | 00 | 00 | 00 | 8 |
| 00 | 00 | 00 | 00 | 00 | 00 | 00 | 00 | 9 |
| 00 | 00 | 00 | 00 | 00 | 00 | 00 | 00 | 10 |
| 00 | 00 | 00 | 00 | 00 | 00 | 00 | 00 | 11 |
| 00 | 00 | 00 | 01 | 00 | 00 | 00 | 00 | 12 |

-continued

| $V_0$ | $I_0$ | $I_L$ | $I_3$ | $I_8$ | $V_2$ | $V_8$ | $V_H$ | Sample No. |
|---|---|---|---|---|---|---|---|---|
| 00 | 00 | 00 | 01 | 00 | 01 | 00 | 00 | 13 |
| 00 | 00 | 00 | 00 | 00 | 00 | 00 | 00 | 14 |
| 00 | 00 | 00 | 00 | 00 | 00 | 00 | 00 | 15 |
| 00 | 00 | 00 | 00 | 00 | 00 | 00 | 00 | 16 |
| 00 | 00 | 00 | 00 | 00 | 00 | 00 | 00 | 17 |
| 00 | 00 | 00 | 00 | 00 | 00 | 00 | 00 | 18 |
| 00 | 00 | 00 | 00 | 00 | 00 | 00 | 00 | 19 |
| 00 | 00 | 00 | 00 | 00 | 00 | 00 | 00 | 20 |
| 00 | 00 | 00 | 00 | 00 | 00 | 00 | 00 | 21 |
| 00 | 00 | 00 | 00 | 00 | 00 | 00 | 00 | 22 |
| 00 | 00 | 00 | 00 | 00 | 00 | 00 | 00 | 23 |
| 00 | 00 | 00 | 00 | 00 | 00 | 00 | 00 | 24 |
| 00 | 00 | 00 | 00 | 00 | 00 | 00 | 00 | 25 |

During the arcing fault, before the isolating relay was tripped, the maximum voltage and current levels of the signal components were recorded as follows:

Maximum Values of Signal Components (During Fault)

| $V_0$ | $I_0$ | $I_L$ | $I_3$ | $I_8$ | $V_2$ | $V_8$ | $V_H$ |
|---|---|---|---|---|---|---|---|
| (volts) | (mA) | (mA) | (mA) | (mA) | (mV) | (mV) | (mV) |
| 0.3 | 10 | 3 | 5 | 3 | 4 | 3 | 0.7 |

The samples recorded during a data acquisition period occurring during the fault are shown below:

Digitised Samples During Fault (Hex)

| $V_0$ | $I_0$ | $I_L$ | $I_3$ | $I_8$ | $V_2$ | $V_8$ | $V_H$ | Sample No. |
|---|---|---|---|---|---|---|---|---|
| 00 | 00 | 00 | 00 | 00 | 00 | 00 | 00 | 1 |
| 00 | 00 | 03 | 05 | 00 | 06 | 00 | 02 | 2 |
| 00 | 00 | 10 | 1A | 0E | 12 | 0A | 01 | 3 |
| 00 | 00 | 08 | 0F | 01 | 15 | 00 | 00 | 4 |
| 00 | 00 | 05 | 05 | 00 | 0F | 00 | 04 | 5 |
| 00 | 00 | 00 | 00 | 12 | 02 | 01 | 01 | 6 |
| 00 | 00 | 00 | 00 | 02 | 00 | 16 | 00 | 7 |
| 00 | 00 | 00 | 00 | 00 | 00 | 00 | 01 | 8 |
| 01 | 00 | 00 | 00 | 04 | 00 | 00 | 03 | 9 |
| 02 | 00 | 00 | 00 | 0E | 00 | 0B | 00 | 10 |
| 02 | 00 | 00 | 00 | 00 | 00 | 06 | 01 | 11 |
| 01 | 00 | 00 | 00 | 00 | 00 | 00 | 00 | 12 |
| 00 | 00 | 00 | 00 | 00 | 00 | 00 | 00 | 13 |
| 00 | 00 | 00 | 00 | 00 | 00 | 00 | 00 | 14 |
| 00 | 00 | 00 | 00 | 00 | 00 | 00 | 00 | 15 |
| 00 | 00 | 00 | 00 | 00 | 00 | 00 | 00 | 16 |
| 00 | 00 | 10 | 18 | 0D | 00 | 12 | 00 | 17 |
| 00 | 01 | 13 | 1B | 04 | 19 | 02 | 01 | 18 |
| 00 | 01 | 09 | 10 | 00 | 12 | 00 | 04 | 19 |
| 00 | 00 | 05 | 07 | 03 | 0B | 01 | 00 | 20 |
| 00 | 00 | 00 | 00 | 11 | 04 | 0E | 01 | 21 |
| 00 | 00 | 00 | 00 | 00 | 00 | 00 | 04 | 22 |
| 00 | 00 | 00 | 00 | 00 | 00 | 00 | 02 | 23 |
| 00 | 00 | 00 | 00 | 0A | 00 | 07 | 00 | 24 |
| 00 | 00 | 00 | 00 | 06 | 00 | 0D | 02 | 25 |

The relation between the analog lues of voltage and current for the signal components and the digitised sample values are in accordance with the tabulated conversion values shown in Appendix A.

By way of example, if the individual threshold levels for the signal components are considered as zero, the pattern sums X for the above sample data may be easily calculated. In effect the pattern sum X for sample data during a given data acquisition pattern may be determined by: i) summing the number of samples for each signal component in which the sample value is greater than the corresponding individual threshold; ii) multiplying each sum resulting from i) by its corresponding weight value; and iii) adding the weighted sums to determine the overall pattern sum X. This process is illustrated step-by-step below for the test data both before and during the arcing fault, with zero individual thresholds.

Before Fault i) Number of signal component samples greater than threshold (zero):

| $V_0$ | $I_0$ | $I_L$ | $I_3$ | $I_8$ | $V_2$ | $V_8$ | $V_H$ |
|---|---|---|---|---|---|---|---|
| 0 | 0 | 0 | 2 | 0 | 1 | 0 | 0 | ii) Multiply by weight values:

| $V_0$ | $I_0$ | $I_L$ | $I_3$ | $I_8$ | $V_2$ | $V_8$ | $V_H$ |
|---|---|---|---|---|---|---|---|
| (×0) | (×1) | (×3) | (×2) | (×2) | (×3) | (×2) | (×1) |
| 0 | 0 | 0 | 4 | 0 | 3 | 0 | 0 | iii) Pre-fault pattern sum: $X_b$ = 07 (Hex)

During Fault i) Number of signal component samples greater than threshold (zero):

| $V_0$ | $I_0$ | $I_L$ | $I_3$ | $I_8$ | $V_2$ | $V_8$ | $V_H$ |
|---|---|---|---|---|---|---|---|
| 4 | 2 | 8 | 8 | C | 9 | B | D | ii) Multiply by weight values:

| $V_0$ | $I_0$ | $I_L$ | $I_3$ | $I_8$ | $V_2$ | $V_8$ | $V_H$ |
|---|---|---|---|---|---|---|---|
| (×0) | (×1) | (×3) | (×2) | (×2) | (×3) | (×2) | (×1) |
| 0 | 2 | 18 | 10 | 18 | 1B | 16 | D | iii) Pattern sum during fault: $X_d$ = 80 (Hex)

Clearly, using this strategy and the pattern sum threshold from Appendix A of 40 (Hex), a fault condition would be detected since the difference between the pattern sums before and during the fault is greater than the threshold, ie:

$X_d - X_b$ = 79 (Hex)

> 40 (Hex) (Pattern Sum threshold)

In practice it has been found that a threshold level of 10 (Hex) for the individual signal components yields accurate fault detection whilst substantially eliminating the effects of ordinary voltage and current fluctuations on the detection scheme. It must be kept in mind, however, that the individual threshold levels for the signal components must be balanced against the overall pattern sum threshold, since each affects the sensitivity of the fault detector. This is clearly demonstrated by calculating the pattern sums for the above sample data before and during a fault using an individual threshold level of 10 (Hex) for each component, which yields:

$X_b=0$ $X_d=23$ (Hex)

Thus, to detect this particular fault using an individual threshold level of 10 (Hex), it would be necessary to have a pattern sum threshold which is less than 23 (Hex) (i.e. less than $X_d-X_b$).

Appendix B shows a listing of computer software program code in assembly language suitable for a Motorola MC6802 microprocessor, which has been developed to implement the functions of the described embodiment which are controllable by the microprocessor control unit 30.

Although the foregoing description has been explained in relation to a single phase arcing fault, such as a single phase line contacting a tree or the like, the technique and apparatus described herein is in fact applicable to a number of applications. For example, other arcing faults and phenomena can be detected, such as partial discharge through high impedance medium resulting from leakage currents in aging or failing insulation material. Furthermore, high energy faults such as two phase and three phase line to line faults can be detected where these result in arcing between the conductors. Certain types of equipment used on the electrical distribution system can also be detected, such as arc furnaces and arc welders, which can be useful for the recording purposes of the electrical supplier or for protecting sensitive electrical equipment on the distribution system from any adverse effects of the arcing equipment.

The foregoing has been put forward by way of example only, and many modifications will be apparent to those skilled in the art without departing from the spirit and scope of the invention as defined in the claims appended hereto.

APPENDIX A

EXAMPLE WEIGHTS FOR SIGNAL COMPONENTS:

| $V_0$ | $I_0$ | $I_L$ | $I_3$ | $I_8$ | $V_2$ | $V_8$ | $V_H$ |
|---|---|---|---|---|---|---|---|
| 0 | 1 | 3 | 2 | 2 | 3 | 2 | 1 |

EXAMPLE THRESHOLD FOR "PATTERN SUM" X:   40 (HEX)

CONVERSION RELATION BETWEEN MEASURE D (ANALOG) VALUE AND SAMPLED DIGITAL VALUE $V_0$ (V)
| ANALOGUE VALUE: | 00 | 0.7 | 1.5 | 3.0 | 6.0 | 12 | 15 | 30 |
| DIGITAL VALUE: | 00 | 04 | 09 | 11 | 22 | 44 | 88 | FF |

$V_2$ (mV)
| ANALOGUE VALUE: | 00 | 0.7 | 1.5 | 3.0 | 6.0 | 12 | 15 | 30 |
| DIGITAL VALUE: | 00 | 04 | 09 | 11 | 22 | 44 | 88 | FF |

$I_0$ (A)
| ANALOGUE VALUE: | 00 | .07 | .15 | .30 | .63 | 1.2 | 2.5 | 5.0 |
| DIGITAL VALUE: | 00 | 04 | 09 | 11 | 22 | 44 | 88 | FF |

$I_L$ (mA)
| ANALOGUE VALUE: | 00 | 0.7 | 1.5 | 3.0 | 6.0 | 12 | 15 | 30 |
| DIGITAL VALUE: | 00 | 04 | 09 | 11 | 22 | 44 | 88 | FF |

$I_3$ (mA)
| ANALOGUE VALUE: | 00 | .7 | 1.5 | 3.0 | 6.0 | 12 | 15 | 30 |
| DIGITAL VALUE: | 00 | 04 | 09 | 11 | 22 | 44 | 88 | FF |

$I_8$ (mA)
| ANALOGUE VALUE: | 00 | .7 | 1.5 | 3.0 | 6.0 | 12 | 15 | 30 |
| DIGITAL VALUE: | 00 | 04 | 09 | 11 | 22 | 44 | 88 | FF |

$V_8$ (mV)
| ANALOGUE VALUE: | 00 | 0.7 | 1.5 | 3.0 | 6.0 | 12 | 15 | 30 |
| DIGITAL VALUE: | 00 | 04 | 09 | 11 | 22 | 44 | 88 | FF |

$V_H$ (mV)
| ANALOGUE VALUE: | 00 | 0.7 | 1.5 | 3.0 | 6.0 | 12 | 15 | 30 |
| DIGITAL VALUE: | 00 | 04 | 09 | 11 | 22 | 44 | 88 | FF |

APPENDIX B

2500 A.D. 6..0 Macro Assembler  -  Version 4.01b

Input  Filename : rr7.asm
Output Filename : rr7.obj

```
 1                              ***************************
 2                              *        PROGRAM          *
 3                              *    FOR POTOTYPE RELAY   *
 4                              * PART A FROM M1000       *
 5                              * PART B FROM M           *
 6                              * PART C FROM M           *
 7                              * IRQ    FROM M           *
 8                              *
 9                              * PART A
10   1080                       ORG $1080
11           0200               RAMSTART EQU $0200
12           1FFF               RAMEND EQU $1FFF
13           0200               REGISTERS EQU RAMSTART
14                              *SETTINGS
15   1080                       STC RMB 1              ;THRESHOLD FOR CUT,CUTTER
16   1081                       STCV0 RMB 1            ;CUTTER FOR V0
17   1082                       STCI0 RMB 1            ;CUTTER FOR I0
18   1083                       STCI1 RMB 1            ;CUTTER
19   1084                       STCI3 RMB 1            ;CUTTER
20   1085                       STCI8 RMB 1            ;CUTTER
21   1086                       STCV2 RMB 1            ;CUTTER
22   1087                       STCV8 RMB 1            ;CUTTER
23   1088                       STCVh RMB 1            ;CUTTER
24   1089                       STCA RMB 2             ;ADDR OF CUTTERS
25   108B                       STUBL RMB 1            ;SETTING OF UNBALANCE I0
26   108C                       GFI1 RMB 1             ;SETTING FOR GROUND FAULT
27   108D                       GFI2 RMB 1
28   108E                       GFI3 RMB 1
29   108F                       STSU RMB 1             ;SETTING FOR THREHOLD OF
30                              *   REGISTERS
31   1090                       MSUM RMB 1             ;MAX SUM
32   1091                       RGF RMB 1              ;R FOR GF
33   1092                       SUM12C RMB 1           ; SUM OF THE DEF
34   1093                       SUM12 RMB 1
35   1094                       SUM13C RMB 1
36   1095                       SUM13 RMB 1
37   1096                       SUM14C RMB 1
38   1097                       SUM14 RMB 1
39   1098                       SUM15C RMB 1
40   1099                       SUM15 RMB 1
41   109A                       SUM16C RMB 1
42   109B                       SUM16 RMB 1
43   109C                       SUMC RMB 1
44   109D                       SUM RMB 1
45                              *
46   109E                       ST1 RMB 1              ;SMALLEST SIG YOU ALLOWED
47                              * ADJUSTMENT
```

- 36 -

```
48    109F              SET     RMB  1           ;SETTING VALUE OF SIG.
49    10A0              LEDCO   RMB  1           ;STORT LED CODE FOR INDIC
50    10A1              ADDR    RMB  2           ;FOR CHANGE CONTENT OF IX
51    10A3              NS1     RMB  1           ;NUMBER OF SAMPLES WILL B
52    10A4              ADX     RMB  1           ;VALUE WILL ADD TO INDEX,
53    10A5              C       RMB  1           ;FOR  SIG. ADJ. COUNT.
54    10A6              C1      RMB  1
55    10A7              MAX     RMB  1           ;STORE MAX VALUE OF SIG.
56    10A8              * DETECTION
57    10A9              COUNT1  RMB  1           ;FOR 8
58    10AA              COUNT2  RMB  1           ;FOR 25
59    10AA              COUNT3  RMB  1           ;FOR 200
60    10AB              COUNT4  RMB  1           ;FOR 2
61    10AC              TIME    RMB  1           ; COUNT FOR DELAY
62
63    10AD              SAMPLE  RMB  2           ;FIRST ADDR OF SAMPLE
64    10AF              NUMBER  RMB  2           ;ADDR OF NUMBER AFTER CUT
65    10B1              NB1A    RMB  1           ;SHIFT MULTIPLICAND STORE
66    10B2              NB1     RMB  1           ;MULTIPLICAND
67    10B3              NB2     RMB  1           ;MULTIPLIER
68    10B4              ANS2    RMB  1           ;UPPER BYTE OF RESULT
69    10B5              ANS1    RMB  1           ;LOWER BYTE OF RESULT
70    10B6              X1      RMB  2           ;POINT ADDR OF SMAPLES
71    10B8              X2      RMB  2           ;POINT ADDR OF NUMBERS
72    10BA              XP      RMB  2           ;POINT ADDR OF PRIORITY
73    10BC              XD      RMB  2           ;POINT ADDR OF DEFERENCE
74    10BE              X11     RMB  2           ;FOR TRANSFER
75    10C0              X12     RMB  2           ;FOR TRANSFER
76                      * direction
77    10C2              NSV     RMB  1           ;NUMBER OF SAMPLE SCANED FOR V
78    10C3              NSI     RMB  1           ;NUMBER OF SAMPLE SCANED FOR I
79    10C4              NST     RMB  1           ;TEMP
80    10C5              MAX1    RMB  1           ;MAX VALUE
81    10C6              DIR     RMB  1           ;CODE FOR RESULT OF DIRECTION
82                      *
83           8000       PIA1AD  EQU  $8000       ; PIA1
84           8001       PIA1AC  EQU  $8001
85           8002       PIA1BD  EQU  $8002
86           8003       PIA1BC  EQU  $8003
87           4000       PIA2AD  EQU  $4000       ; PIA2
88           4001       PIA2AC  EQU  $4001
89           4002       PIA2BD  EQU  $4002
90           4003       PIA2BC  EQU  $4003
91                      *
92                      *PROGRAMS  FOLLOWS
93                      ***********
94                      * CONNECTION PROGRAM
95    0200                ORG   $0200
96    0200  BD 0C 43      JSR   DELAY
97                      *PIA INITIAL
98    0203  7F 80 01      CLR   PIA1AC           ; PIA1 INITIAL
99    0206  7F 80 00      CLR   PIA1AD           ; PIA1A AS INPUT
100   0209  86 27         LDAA  #%00100111       ;HANDSHAKE MODE
101   020B  B7 80 01      STAA  PIA1AC
102   020E  7F 80 03      CLR   PIA1BC
103   0211  86 FF         LDAA  #$FF
104   0213  B7 80 02      STAA  PIA1BD           ; PIA1B AS OUTPUT
```

- 37 -

```
105    0216   86 04           LDAA #4
106    0218   B7 80 03        STAA PIA1BC
107                    *
108    021B   7F 40 01        CLR PIA2AC            ;PIA2 INITIAL
109    021E   7F 40 00        CLR PIA2AD
110    0221   86 07           LDAA #%00000111
111    0223   B7 40 00        STAA PIA2AD           ;PIA2 PA FOR MD SELECTI
112    0226   86 04           LDAA #$4
113    0228   B7 40 01        STAA PIA2AC
114                    *
115    022B   7F 40 03        CLR PIA2BC            ;PIA PB AS OUTPUT
116    022E   7F 40 02        CLR PIA2BD            ; FOR OUTPUT BORAD
117    0231   86 FF           LDAA #$FF
118    0233   B7 40 02        STAA PIA2BD
119    0236   86 04           LDAA #$4
120    0238   B7 40 03        STAA PIA2BC
121                    *
122    023B   8E 1F FF        LDS #RAMEND           ;POINT 1FFF
123    023E   CE 0B 0E        LDX #INTROUT
124    0241   DF 00           STX $0000             ; USER IRQ ADDR
125                    *
126    0243   B6 40 00        LDAA PIA2AD
127    0246   84 C0           ANDA #%11000000      ;ONLY CHECK PA7,PA6.
128    0248   81 00           CMPA #0
129    024A   27 0D           BEQ AA
130    024C   81 80           CMPA #%10000000
131    024E   27 0C           BEQ BB
132    0250   81 40           CMPA #%01000000
133    0252   27 0B           BEQ CC
134                    *END AUTO START FOR NEXT TIME
135    0254   86 10           LDAA #$10             ;NOT = SUM
136    0256   97 2C           STAA $002C            ;CHANGE THE SUM FOR
137                    *                             ; GET OUT
138    0258   3F              SWI
139                    *
140    0259   7E 03 00        AA JMP ADJUSTMENT
141    025C   7E 06 00        BB JMP TEST
142    025F   7E 08 00        CC JMP DETECTION
143                    ******************************************
144                    *ADJUSTMENT PROGRAM
145    0300                   ORG $0300
146    0300   01              ADJUSTMENT NOP
147                    *SETTINGS
148    0301   3F              SWI
149                    ********************
150                    *ADD INDEX SUBROTINE
151                    *BEFORE: STORE VALUE IN X, ADD VALUE IN ADX
152                    *AFTER:  ADDED VALUE STORED IN X.
153    0302   FF 19 08        ADIX STX $1908        ;HIGH OF X IN M1908, LOW IN
154    0305   B6 19 09         LDAA $1909
155    0308   BB 10 A4         ADDA ADX
156    030B   B7 19 09         STAA $1909
157    030E   FE 19 08         LDX $1908
158    0311   39               RTS
159                    *
160                    ******   ******
161                    *GET MA   ALUE SUBROUNTINE
```

- 38 -

```
162              *BEFORE PROGRAM:
163              *        THE FIRST ADD. OF SIG. FOR SCAN SHOUL
164              *        AND NUMBER OF SAMPLES IN NS1.
165              *AFTER PROGRAM:
166              *        THE MAX VALUE STORED IN MAX
167  0312  7F 10 A7    GETMAX CLR MAX
168  0315  A6 00       GMAX LDAA $00,X
169  0316  0C            CLC
170  0317  46            RORA            ;NO NEGTATIVE IN A
171  0319  0C            CLC
172  031A  F6 10 A7      LDAB MAX        ;MAX IS NUMBER WHICH IS M
173  031D  11            CBA             ;A - B ->
174  031E  2B 03         BMI GMAX1       ;A<B (N IS SET),BRANCH.
175  0320  B7 10 A7      STAA MAX        ;GET NEW MAX IF A>=B
176  0323  FF 10 E0    GMAX1 STX $10E0   ;ADD 8 FOR EACH TIME.
177  0326  86 08         LDAA #$08
178  0328  BB 10 E1      ADDA $10E1
179  032B  B7 10 E1      STAA $10E1
180  032E  FE 10 E0      LDX $10E0
181  0331  7A 10 A3      DEC NS1
182  0334  26 DF         BNE GMAX
183  0336  39            RTS             ;RETUNE IF FINISH.
184              ********
185              *LED FLASH SUBROUNTINE
186  0337  01       LEDFLASH NOP
187  0338  C6 03      LDAB #$03    ; THE TIME OF FLASH
188  033A  B6 10 A0 LFLASH LDAA LEDCO
189  033D  B7 80 02   STAA PIA1BD       ;LIGHT ON
190  0340  BD 03 52   JSR ENABLE        ;ENABLE LIGHT ON
191  0343  BD 03 5E   JSR TD1           ;TIME DELAY
192  0346  BD 03 58   JSR ENABLE_       ;LIGHT OFF
193  0349  BD 03 5E   JSR TD1
194  034C  5A         DECB
195  034D  C1 00      CMPB #$00
196  034F  26 E9      BNE LFLASH
197  0351  39         RTS
198              **********
199              *ENABLE LIGHT ON
200              *THIS CAN BE DONE WHEN SWICH-1 IN
201              * MD IS ON.
202  0352  86 C0    ENABLE LDAA #$C0    ;CODE IS %110XXXXX.
203  0354  B7 40 00   STAA PIA2AD
204  0357  39         RTS
205              ******
206              *NOT ENABLE LIGHT
207  0358  86 00    ENABLE_ LDAA #$00   ;ANY CODE WHICH IS
208              *                      ; NOT %110XXXXX.
209  035A  B7 40 00   STAA PIA2AD
210  035D  39         RTS
211              ********
212              *TIME DELAY FOR FLASH SUBROUTINE
213  035E  CE FF FF  TD1 LDX #$FFFF
214  0361  09        TD11 DEX
215  0362  26 FD       BNE TD11
216  0364  39          RTS
217              ***************
218              *INDICATE AFTER EACH ADJUSTMENT
```

```
219  0365   B6 10 A0       INDICATE LDAA LEDCO    ;FOR LD ON CB TOP-2
220  0368   B7 80 02         STAA PIA1BD          ;INDICATE GREEN LIGHT
221  036B   BD 03 52         JSR ENABLE
222  036E   BD 0C 43         JSR DELAY            ;DELAY 3 SECOND FOR INDIC
223  0371   39               RTS
224                   ******************************************
225                   * TEST PROGRAM
226  0600                ORG $0600
227  0600   86 22       TEST LDAA #$22
228  0602   3F               SWI
229                   *
230                   ******************************************
231                   *DETECTION
232  0800                ORG $0800
233  0800   01          DETECTION NOP
234                   *CLEAR M1000 - M1FFF
235  0801   CE 10 00         LDX #$1000
236  0804   86 00            LDAA #0
237  0806   A7 00       CLEAR STAA $00,X
238  0808   08               INX
239  0809   8C 1F FF         CPX #$1FFF
240  080C   26 F8            BNE CLEAR
241  080E   01               NOP
242                   *SETTING
243  080F   86 10            LDAA #$10
244  0811   B7 10 81         STAA STCV0           ;THRESHOLD FOR CUT    AL
245  0814   86 10            LDAA #$10
246  0816   B7 10 82         STAA STCI0           ;THRESHOLD FOR CUT
247  0819   86 04            LDAA #$04
248  081B   B7 10 84         STAA STCI3           ;THRESHOLD FOR CUT
249  081E   86 02            LDAA #$02
250  0820   B7 10 83         STAA STCI1           ;THRESHOLD FOR CUT
251  0823   86 04            LDAA #$04
252  0825   B7 10 85         STAA STCI8           ;THRESHOLD FOR CUT
253  0828   86 04            LDAA #$04
254  082A   B7 10 86         STAA STCV2           ;THRESHOLD FOR CUT
255  082D   86 04            LDAA #$04
256  082F   B7 10 87         STAA STCV8           ;THRESHOLD FOR CUT
257  0832   86 10            LDAA #$10
258  0834   B7 10 88         STAA STCVh           ;THRESHOLD FOR CUT
259                   *
260  0837   86 08            LDAA #$08
261  0839   B7 10 8B         STAA STUBL           ;SETTING FOR UNBALANCE IO
262                   *  ZERO CURRENT SETTINGS FOR GROUND FAULT
263  083C   86 7F            LDAA #$7F            ;MAX $7F (EGUAL TO $$FF I
264  083E   B7 10 8C         STAA GFI1            ;SETTING FOR GROUND FAULT
265  0841   86 40            LDAA #$40
266  0843   B7 10 8D         STAA GFI2            ;IN ZONE 2   5A
267  0846   86 30            LDAA #$30
268  0848   B7 10 8E         STAA GFI3            ;IN ZONE 3   3A
269                   *  THREHOLD FOR CONFIRMING F (CAN BE CHANGED
270  084B   86 50            LDAA #$50
271  084D   B7 10 8F         STAA STSU
272                   * INPUT PRIORITY TABLE.   TOTAL IS 14
273  0850   86 00            LDAA #0
274  0852   B7 10 40         STAA $1040           ;V0 0%
275  0855   86 01            LDAA #1
```

- 40 -

| 276 | 0857 | B7 10 41 | STAA $1041 | ;I0 0% |
|---|---|---|---|---|
| 277 | 085A | 86 02 | LDAA #2 | |
| 278 | 085C | B7 10 42 | STAA $1042 | ;I3 20% |
| 279 | 085F | 86 03 | LDAA #3 | |
| 280 | 0861 | B7 10 43 | STAA $1043 | ;I1 25% |
| 281 | 0864 | 86 02 | LDAA #2 | |
| 282 | 0866 | B7 10 44 | STAA $1044 | ;I8 20% |
| 283 | 0869 | 86 03 | LDAA #3 | |
| 284 | 086B | B7 10 45 | STAA $1045 | ;V2 25% |
| 285 | 086E | 86 02 | LDAA #2 | |
| 286 | 0870 | B7 10 46 | STAA $1046 | ;V8 20% |
| 287 | 0873 | 86 01 | LDAA #1 | |
| 288 | 0875 | B7 10 47 | STAA $1047 | ;Vh 10% |
| 289 | | | * | |
| 290 | 0878 | 01 | NOP | |
| 291 | 0879 | CE 11 00 | PARTB LDX #$1100 | ; ADDR OF GS1 |
| 292 | 087C | BD 0A CA | JSR GETGS | |
| 293 | | | * UNBALANCE TEST | |
| 294 | 087F | 86 1D | AGAIN LDAA #$1D | ;29 SAMPLES |
| 295 | 0881 | B7 10 A3 | STAA NS1 | |
| 296 | 0884 | CE 11 01 | LDX #$1101 | ;POINT TO I0 |
| 297 | 0887 | BD 03 12 | JSR GETMAX | |
| 298 | 088A | F6 10 A7 | LDAB MAX | |
| 299 | 088D | 0C | CLC | |
| 300 | 088E | 56 | RORB | |
| 301 | 088F | 0C | CLC | |
| 302 | 0890 | B6 10 8B | LDAA STUBL | ;SETTING MAX $7F |
| 303 | 0893 | 11 | CBA | |
| 304 | 0894 | 2A 05 | BPL GO | ;N=0,BRA WHEN SETTING |
| 305 | 0896 | 86 8E | LDAA #$8E | ;INDICATE UNBALANCE |
| 306 | 0898 | B7 40 02 | STAA PIA2BD | |
| 307 | | | * | |
| 308 | 089B | CE 11 F0 | GO LDX #$11F0 | ; ADDR OF GS2 |
| 309 | 089E | BD 0A CA | JSR GETGS | |
| 310 | 08A1 | CE 11 00 | LDX #$1100 | ;ADDR OF GS1 |
| 311 | 08A4 | FF 10 B6 | STX X1 | |
| 312 | 08A7 | CE 10 00 | LDX #$1000 | ; NUMBER 1 |
| 313 | 08AA | FF 10 B8 | STX X2 | |
| 314 | 08AD | BD 0B 13 | JSR CUTTT | |
| 315 | | | * | |
| 316 | 08B0 | CE 11 F0 | LDX #$11F0 | ;ADDR OF GS2 |
| 317 | 08B3 | FF 10 B6 | STX X1 | |
| 318 | 08B6 | CE 10 08 | LDX #$1008 | ; NUMBER 2 |
| 319 | 08B9 | FF 10 B8 | STX X2 | |
| 320 | 08BC | BD 0B 13 | JSR CUTTT | |
| 321 | | | * | |
| 322 | 08BF | BD 0B 78 | JSR COMP1 | |
| 323 | | | * | |
| 324 | 08C2 | CE 10 40 | LDX #$1040 | ;ADDR OF PRIORITY |
| 325 | 08C5 | FF 10 BA | STX XP | |
| 326 | 08C8 | CE 10 48 | LDX #$1048 | ;ADDR OF DEF12 |
| 327 | 08CB | FF 10 BC | STX XD | |
| 328 | 08CE | BD 0B 98 | JSR GETSU | |
| 329 | | | * | |
| 330 | 08D1 | 86 BE | LDAA #$BE | |
| 331 | 08D3 | B7 40 02 | STAA PIA2BD | ;DISPLAY GREEN LED |
| 332 | | | * | ; WHEN NORMAL OR BACK NORMAL. |

- 41 -

```
333  08D6  BD 0C DF    JSR MAXSUM        ;STORE MAX SUM
334  08D9  F6 10 9D    LDAB SUM
335  08DC  F7 10 93    STAB SUM12
336  08DF  B6 10 9C    LDAA SUMC
337  08E2  B7 10 92    STAA SUM12C
338  08E5  81 00       CMPA #$00         ;IF CARRY>=1,GOON 1
339  08E7  2E 0A       BGT  GOON1
340  08E9  59          ROLB              ;MS BID TO CARRY
341  08EA  25 07       BCS GOON1         ;BR WHEN CARRY SET
342  08EC  0C          CLC
343  08ED  56          RORB              ;BACK WHIT NO NEGATIVE
344  08EE  0C          CLC
345  08EF  C1 03       CMPB #$03         ;THRESHOLD FOR T1
346  08F1  2D 7B       BLT ONEEE         ;IF NO DISTURBANCE
347  08F3  86 B8       GOON1 LDAA #$B8
348  08F5  B7 40 02    STAA PIA2BD       ;DISPLAY GREEN AND RED
349  08F8  CE 11 F1    LDX #$11F1
350  08FB  BD 0C FC    JSR GFAULT        ;DETECTION FOR GF
351  08FE  CE 12 E0    LDX #$12E0        ;GET 200 SAMPLE FOR GS
352  0901  BD 0A E7    JSR GETGS2
353                    *
354                    *
355  0904  CE 12 E0    LDX #$12E0        ;ADDR OF GS3
356  0907  FF 10 B6    STX X1
357  090A  CE 10 10    LDX #$1010        ;ADDR. OF NUMBER3
358  090D  FF 10 B8    STX X2
359  0910  BD 0B 13    JSR CUTTT
360  0913  CE 13 C8    LDX #$13C8        ;SECOND HALF
361  0916  FF 10 B6    STX X1
362  0919  CE 10 10    LDX #$1010
363  091C  FF 10 B8    STX X2
364  091F  BD 0B 13    JSR CUTTT
365                    *
366  0922  BD 0C 06    JSR COMP2
367                    *
368  0925  CE 10 40    LDX #$1040        ;ADDR OF PRIORITY
369  0928  FF 10 BA    STX XP
370  092B  CE 10 50    LDX #$1050        ;ADDR OF DEF13
371  092E  FF 10 BC    STX XD
372  0931  BD 0B 98    JSR GETSU
373                    *
374  0934  F6 10 9D    LDAB SUM
375  0937  F7 10 95    STAB SUM13
376  093A  B6 10 9C    LDAA SUMC
377  093D  B7 10 94    STAA SUM13C
378  0940  81 00       CMPA #$00         ;IF CARRY>=1 GOON2
379  0942  2E 0A       BGT GOON2
380  0944  59          ROLB              ;MS BID TO CARRY
381  0945  25 07       BCS GOON2         ;BR WHEN CARRY SET
382  0947  0C          CLC
383  0948  56          RORB              ;BACK WHIT NO NEGATIVE
384  0949  0C          CLC
385  094A  C1 60       CMPB #$60         ;THRESHOLD FOR T2
386  094C  2D 35       BLT TWOOO
387  094E  7E 09 99    GOON2 JMP PARTC
388  0951  86 55       LDAA #$55         ;LD #$00 FOR DIR
389  0953  B7 10 C6    STAA DIR          ;CLEAR THE CODE
```

```
390  0956  BD 0C 43         JSR DELAY
391  0959  B6 10 C6         LDAA DIR
392  095C  81 55            CMPA #%01010101      ;CHECK THE CODE
393  095E  26 03            BNE WDIR
394  0960  7E 09 99         JMP PARTC            ;GO TO PART C IF CRREN
395  0963  86 10       WDIR LDAA #$10
396  0965  B7 40 02         STAA PIA2BD          ;INDICATE G,R3 FOR WRO
397  0968  BD 0C C0         JSR CLESU            ;CLEAR SUM AND NUMBER
398  096B  7E 08 7F         JMP AGAIN            ;HAVING CHANGE TO CHEC
399                                              ; AND AGAIN UNTILL FAU
400                     *
401  096E  CE 11 00    ONEEE LDX #$1100          ;ADDR OF GS1
402  0971  FF 10 BE         STX X11
403  0974  CE 11 F0         LDX #$11F0           ;ADDR OF GS2
404  0977  FF 10 C0         STX X12
405  097A  BD 0C 26         JSR TRANS
406  097D  BD 0C C0         JSR CLESU            ;CLEAR DEF & SUM
407  0980  7E 08 7F         JMP AGAIN
408                     *
409  0983  CE 11 00    TWOOO LDX #$1100          ;ADDR OF GS1,ONLY TRAN
410  0986  FF 10 BE         STX X11
411  0989  CE 12 E0         LDX #$12E0           ;ADDR OF GS3
412  098C  FF 10 C0         STX X12
413  098F  BD 0C 26         JSR TRANS
414  0992  BD 0C C0         JSR CLESU            ;CLEAR DEF & SUM
415  0995  7E 08 7F         JMP AGAIN
416                     *
417                     *PRAT C:
418                     *CONFIRM FAULT
419  0998  01               NOP
420  0999  01          PARTC NOP
421  099A  01               NOP
422  099B  86 B8            LDAA #$B8
423  099D  B7 40 02         STAA PIA2BD          ;DISPLAY GREEN AND Y2
424                     *                        ; WHEN DISTURBABCE
425                     * CONFIRMING WITH GROUP OF SAMPLE 4
426  09A0  CE 14 C0         LDX #$14C0           ;GET 2*232 SAMPLES FO
427  09A3  BD 0A E7         JSR GETGS2
428  09A6  CE 14 C0         LDX #$14C0           ;ADDR OF GS4
429  09A9  FF 10 B6         STX X1
430  09AC  CE 10 18         LDX #$1018           ;ADDR. OF NUMBER4
431  09AF  FF 10 B8         STX X2
432  09B2  BD 0B 13         JSR CUTTT
433  09B5  CE 15 A8         LDX #$15A8           ;SECOND HALF
434  09B8  FF 10 B6         STX X1
435  09BB  CE 10 18         LDX #$1018
436  09BE  FF 10 B8         STX X2
437  09C1  BD 0B 13         JSR CUTTT
438                     *
439  09C4  BD 0C 59         JSR COMP3
440                     *
441  09C7  CE 10 40         LDX #$1040           ;ADDR OF PRIORITY
442  09CA  FF 10 BA         STX XP
443  09CD  CE 10 58         LDX #$1058           ;ADDR OF DEF14
444  09D0  FF 10 BC         STX XD
445  09D3  BD 0B 98         JSR GETSU
446                     *
```

```
447  09D6  F6 10 9D      LDAB SUM
448  09D9  F7 10 97      STAB SUM14
449  09DC  B6 10 9C      LDAA SUMC
450  09DF  B7 10 96      STAA SUM14C
451  09E2  81 00         CMPA #$00          ;IF CARRY>=1 GOON3
452  09E4  2E 0A         BGT GOON3
453  09E6  59            ROLB               ;MS BID TO CARRY
454  09E7  25 07         BCS GOON3          ;BR WHEN CARRY SET
455  09E9  0C            CLC
456  09EA  56            RORB               ;BACK WHIT NO NEGATIVE
457  09EB  0C            CLC
458  09EC  C1 40         CMPB #$40          ;THRESHOLD FOR T3
459  09EE  2D 04         BLT TRYAG          ;TRY ANOTHER GS IF NO
460  09F0  01            GOON3 NOP
461  09F1  BD 0C EF      JSR DECST          ;DECREASE THREHOLD OF
462                      * CONFIRMING AGAIN WITH GROUP OF SAMPLE 5
463  09F4  CE 16 A0      TRYAG LDX #$16A0   ;GET 2*232 SAMPLES FO
464  09F7  BD 0A E7      JSR GETGS2
465  09FA  CE 16 A0      LDX #$16A0         ;ADDR OF GS5
466  09FD  FF 10 B6      STX X1
467  0A00  CE 10 20      LDX #$1020         ;ADDR. OF NUMBER5
468  0A03  FF 10 B8      STX X2
469  0A06  CD 0B 13      JSR CUTTT
470  0A09  CE 17 88      LDX #$1788         ;SECOND HALF
471  0A0C  FF 10 B6      STX X1
472  0A0F  CE 10 20      LDX #$1020
473  0A12  FF 10 B8      STX X2
474  0A15  BD 0B 13      JSR CUTTT
475                      *
476  0A18     0C 79      JSR COMP4
477                      *
478  0A1B  CE 10 40      LDX #$1040         ;ADDR OF PRIORITY
479  0A1E  FF 10 BA      STX XP
480  0A21  CE 10 60      LDX #$1060         ;ADDR OF DEF15
481  0A24  FF 10 BC      STX XD
482  0A27  BD 0B 98      JSR GETSU
483                      *
484  0A2A  F6 10 9D      LDAB SUM
485  0A2D  F7 10 99      STAB SUM15
486  0A30  B6 10 9C      LDAA SUMC
487  0A33  B7 10 98      STAA SUM15C
488  0A36  81 00         CMPA #$00          ;IF CARRY>=1 GOON4
489  0A38  2E 0A         BGT GOON4
490  0A3A  59            ROLB               ;MS BID TO CARRY
491  0A3B  25 07         BCS GOON4          ;BR WHEN CARRY SET
492  0A3D  0C            CLC
493  0A3E  56            RORB               ;BACK WHIT NO NEGATIVE
494  0A3F  0C            CLC
495  0A40  C1 40         CMPB #$40          ;THRESHOLD FOR T4
496  0A42  2D 04         BLT LASCON         ;BR LAST CONFIRM
497  0A44  01            GOON4 NOP
498  0A45  BD 0C EF      JSR DECST          ;DECREASE THREHOLD OF
499                      *
500                      * CONFIRMING BEFORE TRIP 'THRESHOLD MAY BE CHAN
501  0A48  CE 18 00      LASCON LDX #$1800  ;GET GS6
502  0A4B  BD 0A E7      JSR GETGS2
503                      *
```

```
504   0A50   CE 18 80      LDX #$1880       ;ADDR OF GS4
505   0A53   FF 10 B6      STX X1
506   0A54   CE 10 28      LDX #$1028       ;NUMBER 6
507   0A57   FF 10 B8      STX X2
508   0A5A   BD 0B 13      JSR CUTTT
509   0A5D   CE 19 68      LDX #$1968       ;SECOND HALF
510   0A60   FF 10 B6      STX X1
511   0A63   CE 10 28      LDX #$1028
512   0A66   FF 10 B8      STX X2
513   0A69   BD 0B 13      JSR CUTTT
514                        *
515   0A6C   BD 0C 99      JSR COMP5
516                        *
517   0A6F   CE 10 40      LDX #$1040       ;ADDR OF PRIORITY
518   0A72   FF 10 BA      STX XP
519   0A75   CE 10 68      LDX #$1068       ;ADDR OF DEF16
520   0A78   FF 10 BC      STX XD
521   0A7B   BD 0B 98      JSR GETSU
522                        *
523   0A7E   F6 10 9D      LDAB SUM
524   0A81   F7 10 9B      STAB SUM16
525   0A84   B6 10 9C      LDAA SUMC
526   0A87   B7 10 9A      STAA SUM16C
527   0A8A   81 00         CMPA #$00        ;IF CARRY>=1
528   0A8C   2E 0B         BGT TRIPP
529   0A8E   59            ROLB             ;MS BID TO CARRY
530   0A8F   25 08         BCS TRIPP        ;BR WHEN CARRY SET
531   0A91   0C            CLC
532   0A92   56            RORB             ;BACK WHIT NO NEGATIVE
533   0A93   0C            CLC
534   0A94   F1 10 8F      CMPB STSU
535   0A97   2D 17         BLT FIVE
536                        *
537   0A99   86 85         TRIPP LDAA #$85  ;TRIP
538   0A9B   B7 40 02      STAA PIA2BD
539   0A9E   BD 0C 43      JSR DELAY
540   0AA1   BD 0C 43      JSR DELAY
541   0AA4   BD 0C 43      JSR DELAY
542   0AA7   BD 0C 43      JSR DELAY
543   0AAA   86 76         LDAA #$76
544   0AAC   B7 40 02      STAA PIA2BD      ;DISPLAY R1,R4 WHEN A
545   0AAF   3F            SWI
546                        *
547                        **
548   0AB0   86 BE         FIVE LDAA #$BE
549   0AB2   B7 80 02      STAA PIA1BD      ;DISPLAY 7 WHEN
550                        *                ; DISTURBANC GONE
551   0AB5   CE 11 00      LDX #$1100       ;ADDR OF GS1
552   0AB8   FF 10 BE      STX X11
553   0ABB   CE 18 80      LDX #$1880       ;ADDR OF GS6
554   0ABE   FF 10 C0      STX X12
555   0AC1   BD 0C 26      JSR TRANS
556   0AC4   BD 0C C0      JSR CLESU        ;CLEAR DEF & SUM
557   0AC7   7E 08 7F      JMP AGAIN
558                        *************
559                        *GETGS SUBROUTINE
560   0ACA   01            GETGS NOP
```

- 45 -

```
561    0ACB    86 E8            LDAA #$E8              ;GET 29*8=232 SAMPLES
562    0ACD    B7 10 AA         STAA COUNT3
563    0AD0    5F               CLRB
564    0AD1    0E               CLI
565    0AD2    B6 80 00         LDAA PIA1AD
566    0AD5    F7 80 02   FEEDD STAB PIA1BD            ;ADDR. TO ADC A2,A1,A0
567    0AD8    3E               WAI                    ;WAITE FOR INTERRUPT
568    0AD9    B6 80 00         LDAA PIA1AD            ;AFTER INTERRUPT
569    0ADC    A7 00            STAA $00,X
570    0ADE    0E               CLI
571    0ADF    08               INX
572    0AE0    5C               INCB
573    0AE1    7A 10 AA         DEC COUNT3
574    0AE4    26 EF            BNE FEEDD
575    0AE6    39               RTS
576                       ************
577                       *GET TWO GS SUBROUTINE
578    0AE7    01         GETGS2 NOP
579    0AE8    86 02            LDAA #$2
580    0AEA    B7 10 AB         STAA COUNT4
581    0AED    0E               CLI
582    0AEE    B6 80 00         LDAA PIA1AD
583    0AF1    86 E8      FD2 LDAA #$E8               ;GET 29*8=232 SAMPLES
584    0AF3    B7 10 AA         STAA COUNT3
585    0AF6    5F               CLRB
586    0AF7    F7 80 02   FEEDD2 STAB PIA1BD           ;ADDR. TO ADC A2,A1,A
587    0AFA    3E               WAI                    ;WAITE FOR INTERRUPT
588    0AFB    B6 80 00         LDAA PIA1AD            ;AFTER INTERRUPT
589    0AFE    A7 00            STAA $00,X
590    0B00    0E               CLI
591    0B01    08               INX
592    0B02    5C               INCB
593    0B03    7A 10 AA         DEC COUNT3
594    0B06    26 EF            BNE FEEDD2
595    0B08    7A 10 AB         DEC COUNT4
596    0B0B    26 E4            BNE FD2
597    0B0D    39               RTS
598                       **********
599                       *DUMMY INTERRUPT ROUTINE
600    0B0E    7D 80 00   INTROUT TST PIA1AD
601    0B11    01               NOP
602    0B12    3B               RTI
603                       *
604
605                       ************
606                       *CUTTT ROUTINE
607                       *SET BEFORE: X1 , X2 .
608                       *THIS ROUTINE CAN CUT 8 SIGNALS WITH
609                       *DIFERENT CUTTER WHICH SHOULD BE SET BEFORE.
                          *M10E0 TO M10E4 USED IN THIS.
610    0B13    FE 10 B6   CUTTT LDX X1
611    0B16    FF 10 AD         STX SAMPLE
612    0B19    FE 10 B8         LDX X2
613    0B1C    FF 10 AF         STX NUMBER             ;STORE THE INITIAL
614                       *                            ; ADDR OF NUMBER
615    0B1F    86 08            LDAA #$08
616    0B21    B7 10 A8         STAA COUNT1            ;8 SAMPLES
617    0B24    CE 10 80         LDX #STC               ;FIRST ADDR OF CUTTE
```

```
618   0B27   08              NEXSIG INX
619   0B28   A6 00                  LDAA 0,X          ;GET CUTTER /NEXT CU
620   0B2A   B7 10 80               STAA STC          ;CURRENT CUTTER
621   0B2D   FF 10 89               STX STCA          ;STORE ADDR OF CURRE
622   0B30   86 1D                  LDAA #$1D
623   0B32   B7 10 A9               STAA COUNT2       ; 29 SAMPLE
624   0B35   FE 10 AD               LDX SAMPLE
625   0B38   A6 00           SAMSIG LDAA 0,X          ;GET SAMPLES
626   0B3A   0C                     CLC
627   0B3B   46                     RORA              ;KEEP VALUE POSITIVE
628   0B3C   0C                     CLC
629   0B3D   F6 10 80               LDAB STC          ;CURRENT CUTTER
630   0B40   10                     SBA
631   0B41   2B 0B                  BMI FORGET        ;SAMP - THRESHOLD <
632   0B43   FF 10 E0               STX $10E0
633   0B46   FE 10 AF               LDX NUMBER
634   0B49   6C 00                  INC $00,X         ;ADD UP IN M1000 - M
635   0B4B   FE 10 E0               LDX $10E0
636   0B4E   FF 10 E2        FORGET STX $10E2         ;X + 8 -> X
637   0B51   B6 10 E3               LDAA $10E3
638   0B54   8B 08                  ADDA #$08
639   0B56   B7 10 E3               STAA $10E3
640   0B59   FE 10 E2               LDX $10E2
641   0B5C   7A 10 A9               DEC COUNT2
642   0B5F   26 D7                  BNE SAMSIG        ;TO NEXT SMPLE OF SA
643   0B61   FE 10 AD               LDX SAMPLE        ;SAMPLE + 1 -> SAMPL
644   0B64   08                     INX
645   0B65   FF 10 AD               STX SAMPLE
646   0B68   FE 10 AF               LDX NUMBER        ;NUMBER + 1 -> NUMBE
647   0B6B   08                     INX
648   0B6C   FF 10 AF               STX NUMBER
649   0B6F   FE 10 89               LDX STCA          ;ADDR OF CURRENT CUT
650   0B72   7A 10 A8               DEC COUNT1
651   0B75   26 B0                  BNE NEXSIG        ;TO NEXT SIGNAL
652   0B77   39                     RTS
653                                 ************
654                                 *COMPARE1 ROUTINE
655   0B78   86 08           COMP1 LDAA #$08
656   0B7A   01                     NOP
657   0B7B   B7 10 A8               STAA COUNT1
658   0B7E   CE 10 00               LDX #$1000
659                                 *
660   0B81   E6 00           ALAN1 LDAB $00,X         ;NUMBER1
661   0B83   A6 08                  LDAA $08,X        ;NUMBER2
662   0B85   10                     SBA
663   0B86   2F 09                  BLE HRVED         ;IF A<=0
664   0B88   A7 48                  STAA $48,X
665   0B8A   08              GOOD1 INX
666   0B8B   7A 10 A8               DEC COUNT1
667   0B8E   26 F1                  BNE ALAN1
668   0B90   39                     RTS
669                                 *
670   0B91   86 00           HRVED LDAA #$00
671   0B93   A7 48                  STAA $48,X
672   0B95   7E 0B 8A               JMP GOOD1
673                                 *
674                                 *********
```

- 47 -

```
675                          *GETSUM ROUTINE
676                          *SET BEFORE: XP , XD
677   0B98   C6 00           GETSU LDAB #$00
678   0B9A   F7 10 9D             STAB SUM
679   0B9D   F7 10 9C             STAB SUMC
680                          *
681   0BA0   86 08                LDAA #$08
682   0BA2   B7 10 A8             STAA COUNT1
683                          *
684   0BA5   FE 10 BA        PREEE LDX XP
685   0BA8   E6 00                 LDAB 0,X
686   0BAA   F7 10 B2              STAB NB1
687   0BAD   08                    INX
688   0BAE   FF 10 BA              STX XP
689   0BB1   FE 10 BC              LDX XD
690   0BB4   A6 00                 LDAA $00,X
691   0BB6   B7 10 B3              STAA NB2
692   0BB9   08                    INX
693   0BBA   FF 10 BC              STX XD
694   0BBD   BD 0B D7              JSR MULTI
695   0BC0   B6 10 B5              LDAA ANS1
696   0BC3   B9 10 9D              ADCA SUM
697   0BC6   25 09                 BCS CARRY
698   0BC8   B7 10 9D        BACKK STAA SUM
699   0BCB   7A 10 A8              DEC COUNT1
700   0BCE   26 D5                 BNE PREEE
701   0BD0   39                    RTS
702                          *
703   0BD1   7C 10 9C        CARRY INC SUMC
704   0BD4   7E 0B C8              JMP BACKK
705                          *
706                          *
707                          *MULTIPLIE ROUTINE
708                          *THE MULTIPLICAND IS STORED IN BYTE NB1
709                          *THE MILTIPLIER IS STORED IN BYTE NB2
710                          *THE RESULT IS STORED IN BYTES ANS2 (UPPER) AN
711                          *ANS1 (LOWER).
712                          *
713   0BD7   01              MULTI NOP
714   0BD8   4F                    CLRA
715   0BD9   B7 10 B1              STAA NB1A
716   0BDC   B7 10 B5              STAA ANS1
717   0BDF   B7 10 B4              STAA ANS2
718   0BE2   B6 10 B3              LDAA NB2
719   0BE5   20 06                 BRA LOOP1
720                          *
721   0BE7   78 10 B2        LOOP2 ASL NB1
722   0BEA   79 10 B1              ROL NB1A
723   0BED   44              LOOP1 LSRA
724   0BEE   24 13                 BCC NOADD
725   0BF0   F6 10 B5              LDAB ANS1
726   0BF3   FB 10 B2              ADDB NB1
727   0BF6   F7 10 B5              STAB ANS1
728   0BF9   F6 10 B4              LDAB ANS2
729   0BFC   F9 10 B1              ADCB NB1A
730   0BFF   F7 10 B4              STAB ANS2
731   0C02   4D                    TSTA
```

```
732  0C03  26 E2         NOADD BNE LOOP2
733  0C05  39             RTS
734                      *
735                      *
736                      *COMPARE 2 ROUTINE
737                      *COMPARE THE NUMBER 3 WITH NUMBER1,
738                      * PUT THE DEFERENCE INTO DEF13
739  0C06  86 08         COMP2 LDAA #$08
740  0C08  01             NOP
741  0C09  B7 10 A8       STAA COUNT1
742  0C0C  CE 10 00       LDX #$1000           ;NUMBER1
743                      *
744  0C0F  E6 00         ALAN2 LDAB $00,X      ;NUMBER1
745  0C11  A6 10          LDAA $10,X           ;NUMBER3
746  0C13  10             SBA                  ;A-B GOTO A
747  0C14  2F 09          BLE HRVE2            ;IF A<=0
748                      *
749  0C16  A7 50          STAA $50,X
750  0C18  08            GOOD2 INX
751  0C19  7A 10 A8       DEC COUNT1
752  0C1C  26 F1          BNE ALAN2
753  0C1E  39             RTS
754                      *
755  0C1F  86 00         HRVE2 LDAA #$00
756  0C21  A7 50          STAA $50,X
757  0C23  7E 0C 18       JMP GOOD2
758                      *
759                      *
760                      *TRANSFER ROUTINE
761                      *SET BEFORE: X11 , X12
762                      *X12 >>> X11
763  0C26  86 E8         TRANS LDAA #$E8
764  0C28  B7 10 AA       STAA COUNT3
765  0C2B  FE 10 C0      TRANN LDX X12
766  0C2E  A6 00          LDAA 0,X
767  0C30  08             INX
768  0C31  FF 10 C0       STX X12
769  0C34  FE 10 BE       LDX X11
770  0C37  A7 00          STAA 0,X
771  0C39  08             INX
772  0C3A  FF 10 BE       STX X11
773  0C3D  7A 10 AA       DEC COUNT3
774  0C40  26 E9          BNE TRANN
775  0C42  39             RTS
776                      *
777                      *
778                      *
779                      *DELAY TIME ROUTINE
780                      * 3 SECONDS
781  0C43  01            DELAY NOP
782  0C44  C6 01          LDAB #$01
783  0C46  F7 10 AC       STAB TIME
784  0C49  86 FF         LOOPA LDAA #$FF
785  0C4B  C6 FF         LOOPB LDAB #$FF
786  0C4D  5A            LOOPC DECB
787  0C4E  26 FD          BNE LOOPC
788  0C50  4A             DECA
```

- 49 -

```
789   0C51   26 F8        BNE LOOPB
790   0C53   7A 10 AC     DEC TIME
791   0C56   26 F1        BNE LOOPA
792   0C58   39           RTS
793                       ***********
```

I claim:

1. A method for detecting a high impedance fault or arcing phenomenon in an AC electrical distribution system having a fundamental frequency, comprising:

a. monitoring electrical signals in said electrical distribution system during a plurality of data acquisition periods;

b. isolating a plurality of predetermined frequency components from the monitored electrical signals within each data acquisition period, wherein each predetermined frequency component has a respective magnitude;

c. individually scaling the respective magnitudes of said predetermined frequency components according to selected scaling factors, wherein each predetermined frequency component is associated with a respective scaling factor;

d. comparing said scaled magnitudes of said predetermined frequency components from a first data acquisition period with the scaled magnitudes of said predetermined frequency components from a preceding data acquisition period; and e. detecting the occurrence of a high impedance fault or arcing phenomenon on the basis of said comparison.

2. The method as claimed in claim 1, wherein the step of individually scaling the respective magnitude of a predetermined frequency component comprises determining and summing the number of sub-periods of said data acquisition period during which the predetermined frequency component is greater than a selected value, and multiplying the resulting sum by a scaling factor corresponding to said predetermined frequency component.

3. The method as claimed in claim 1, wherein the step of comparing said scaled magnitudes comprises comparing the sum of said scaled magnitudes from said first data acquisition period with the sum of the scaled magnitudes from said preceding data acquisition period.

4. The method as claimed in claim 1 wherein the isolated frequency components includes zero-sequence current and voltage signals, and wherein the method includes a step of detecting whether a solid ground fault occurs on the basis of the magnitudes of the zero-sequence current and voltage signals.

5. The method as claimed in claim 1 wherein the comparing step further includes comparing said scaled magnitudes from the first data acquisition period and the preceding data acquisition period with the scaled magnitudes of the predetermined frequency components from a second data acquisition period subsequent to said first data acquisition period.

6. The method as claimed in claim 1 wherein one of said predetermined frequency components has a frequency twice said fundamental frequency.

7. The method as claimed in claim 1 wherein said plurality of frequency components comprises eight voltage and/or current signals.

8. The method as claimed in claim 7 wherein the plurality of frequency components includes a zero-sequence voltage, a second harmonic voltage, an eighth harmonic voltage, a high frequency voltage, a zero-sequence current, a low frequency current, a third harmonic current, and an eighth harmonic current.

9. The method as claimed in claim 1 including a step of confirming occurrence of a high impedance fault by analyzing at least one of said predetermined frequency components to determine whether the magnitude of the at least one predetermined frequency component is modulated at twice the fundamental frequency.

10. The method as claimed in claim 1 including a step of issuing a trip signal when a high impedance fault is detected, thereby causing at least one electrical feeder line of the distribution system to be isolated from a source of said AC electricity.

11. A method for detecting the possible existence of a high impedance fault in an electrical distribution system conveying AC electricity of a fundamental frequency, comprising:

monitoring electrical signals in said electrical distribution system during a plurality of data acquisition periods;

isolating a plurality of predetermined frequency components from the monitored electrical signals during each of a plurality of respective data acquisition periods;

sampling the plurality of predetermined frequency components during at least one data acquisition period;

forming a first pattern which separately represents the respective magnitudes of the plurality of predetermined frequency component samples during said at least one data acquisition period;

comparing said first pattern with a predetermined template pattern; and determining the possible existence of a high impedance fault on the basis of said comparison.

12. The method as claimed in claim 11, wherein the template pattern comprises a pattern formed from samples of said frequency components during a preceding data acquisition period prior to said at least one data acquisition period.

13. The method as claimed in claim 12, including a step of forming a second pattern which individually represents the plurality of predetermined frequency components sampled during a further data acquisition period, and comparing said predetermined template pattern with both said first and second patterns to determine the possible existence of a high impedance fault.

14. The method as claimed in claim 11 including a step of confirming the existence of a high impedance fault by analyzing at least one of said plurality of frequency components from a plurality of data acquisition periods to determine whether the magnitudes of the at least one frequency component is modulated at twice said fundamental frequency.

15. The method as claimed in claim 14 including a step of isolating the confirmed high impedance fault from a source of said AC electricity.

16. A high impedance fault or arcing phenomenon detector for use in an electrical distribution system including at least one electrical feeder line for conveying AC electricity of a fundamental frequency, said detector comprising:

a. monitoring means for monitoring electrical signals on said at least one electrical feeder line during a plurality of data acquisition periods;

b. filtering means for isolating a plurality of predetermined frequency components from the monitored electrical signals within each data acquisition period, wherein each predetermined frequency component has a respective magnitude;

c. weighting means for individually scaling the respective magnitudes of said plurality of predetermined frequency components according to selected scaling factors, wherein each predetermined frequency component is associated with a respective scaling factor;

d. comparison means for comparing said scaled magnitudes of said predetermined frequency components from a first data acquisition period with the scaled magnitudes of said predetermined frequency components from a preceding data acquisition period prior to the first data acquisition period; and e. detecting means for detecting the occurrence of a high impedance fault or arcing phenomenon on said electrical feeder line on the basis of said comparison.

17. An electrical isolation switch for use in an electrical distribution system including at least one electrical feeder line for conveying AC electricity of a fundamental frequency, comprising:

a. monitoring means for monitoring electrical signals on said at least one electrical feeder line during a plurality of data acquisition periods;

b. filtering means for isolating a plurality of predetermined frequency components from the monitored electrical signals within each data acquisition period, wherein each predetermined frequency component has a respective magnitude;

c. weighting means for individually scaling the respective magnitudes of said plurality of predetermined frequency components according to selected scaling factors, wherein each predetermined frequency component is associated with a respective scaling factor;

d. comparison means for comparing said scaled magnitudes of said predetermined frequency components from a first data acquisition period with the scaled magnitudes of said predetermined frequency components from a preceding data acquisition period prior to the first data acquisition period;

e. detecting means to detect the possibility of a high impedance fault on said electrical feeder line on the basis of said comparison and to generate a trip signal if the possibility of a high impedance fault is so detected; and f. means for actuating a switch to electrically isolate said at least one electrical feeder line from a source of said AC electricity upon generation of said trip signal.

18. An electrical isolation switch as claimed in claim 17, further comprising sampling means for sampling the plurality of predetermined frequency components during the first data acquisition period, threshold means for determining if the respective magnitude of the sampled frequency components are greater than a given threshold, and summing means for summing the number of occurrences during the first data acquisition period in which the respective magnitude of a sampled frequency component exceeds the given threshold, and wherein said weighting means comprises means for multiplying the resulting sum by the scaling factor corresponding to the sampled frequency component.

19. An electrical isolation switch as claimed in claim 18 further comprising a means to sum the scaled magnitudes of the plurality of frequency components from the first data acquisition period, such that the comparison means compares the respective sums of the scaled magnitudes of the predetermined frequency components from the first data acquisition period and the preceding data acquisition period.

20. An electrical isolation switch as claimed in claim 19 wherein the summing means and the weighting means sums and weights the predetermined frequency components, respectively, according to:

$$X = \sum_{i=1}^{n} W_i \left( \sum_{j=1}^{m} (S_{ii} > T_i) \right)$$

Where:

X is the weighted sum of the frequency components, n is the number of frequency components, $W_i$ is the individual scaling factor for the respective frequency components, m is the total number of samples during a data acquisition period, $S_{ii}$ is the sample magnitude for the frequency components, and $T_i$ is the individual threshold for each respective frequency component and wherein the comparison means compares the weighted sum X for the first data acquisition period and the preceding data acquisition period.

21. An electrical distribution system comprising:

a source of AC electricity of a fundamental frequency;

at least one electrical feeder line coupled to said source by way of switching means capable of electrically isolating said at least one electrical feeder line from said source upon receipt of a trip signal;

monitoring means for monitoring electrical signals on said at least one electrical feeder line during a plurality of data acquisition periods;

filtering means for isolating a plurality of predetermined frequency components from the monitored electrical signals within each data acquisition period, wherein each predetermined frequency component has a respective magnitude;

weighting means for individually scaling the respective magnitudes of said plurality of predetermined frequency components according to selected scaling factors, wherein each predetermined frequency component is associated with a respective scaling factor; and comparison means for comparing said scaled magnitudes of said predetermined frequency components from a first data acquisition period with the scaled magnitudes of said predetermined frequency components from a preceding data acquisition period prior to the first data acquisition period, and for issuing the trip signal to said switching means if said comparison indicates the possibility of a high impedance fault on said at least one electrical feeder line.

22. A method for detecting an arcing phenomenon in an electrical distribution system comprising the steps of:

monitoring a plurality of selected frequency components $C_n$ of the voltage and current at a point on the distribution system during each of a plurality of data acquisition periods j, wherein n designates respective ones of the plurality of selected frequency components during each of the plurality of data acquisition periods and wherein each selected frequency component has a respective magnitude $M(C_n)$;

generating a first pattern $M_j(C_n)$ representative of the respective magnitudes of the selected frequency components during data acquisition period j;

comparing the first pattern with a pattern $M_{j-1}(C_n)$ generated based upon the respective magnitudes of the selected frequency components during a preceding data acquisition period (j−1) to determine whether the difference therebetween exceeds a pattern threshold $M_t(C_n)$ such that $|M_j(C_n)-M_{j-1}(C_n)|>M_t(C_n)$ for each of the plurality of selected frequency components n; and determining an occurrence of an arcing phenomenon in the system on the basis of the comparison.

23. The method as claimed in claim 22 including monitoring of zero-sequence current in the distribution system and determining the occurrence of a high-energy unbalanced fault on the basis of said zero-sequence current magnitude.

* * * * *

UNITED STATES PATENT AND TRADEMARK OFFICE
CERTIFICATE OF CORRECTION

PATENT NO. : 5,602,709
DATED : February 11, 1997
INVENTOR(S) : Majid Al-Dabbagh

It is certified that error appears in the above-indentified patent and that said Letters Patent is hereby corrected as shown below:

Column 2, line 47, "sealed" should be -- scaled --;

Column 3, line 28, the two vertical lines in the formula should be slanted.

Column 5, line 29, "drawing" should be -- drawings --;

Column 6, line 1, delete "to";

Column 6, line 9, "build up" should be -- buildup --;

Column 7, line 8, "$V_s$" should be -- $V_8$ --;

Column 7, line 14, "$I_s$" should be -- $I_8$ --;

Column 7, line 14, after "current" delete "," and insert -- . --;

Column 8, line 67, and column 9, line 2, "step down" should be -- step-down --;

Column 10, line 67, "type" should be -- types --;

UNITED STATES PATENT AND TRADEMARK OFFICE
CERTIFICATE OF CORRECTION

PATENT NO. : 5,602,709
DATED : February 11, 1997
INVENTOR(S) : Majid Al-Dabbagh

It is certified that error appears in the above-identified patent and that said Letters Patent is hereby corrected as shown below:

Column 11, line 5, "normal" should be -- abnormal --;

Column 11, line 63, "pattern" should be -- patterns --;

Column 13, line 5, "are" should be -- arc --;

Column 13, line 57, "Io" should be -- $I_o$ --;

Column 14, line 2, "millisecond" should be -- milliseconds --;

Column 14, line 34, "components" should be -- component --;

Column 14, lines 56-58, after "components" insert -- , --;

Column 14, line 60, after "period" insert -- , --;

Column 14, line 61, after "components" insert -- , and --;

Column 16, line 4, "born" should be -- borne --;

Column 17, line 55, "lues" should be -- values --;

UNITED STATES PATENT AND TRADEMARK OFFICE
CERTIFICATE OF CORRECTION

PATENT NO. : 5,602,709
DATED : February 11, 1997
INVENTOR(S) : Majid Al-Dabbagh

It is certified that error appears in the above-identified patent and that said Letters Patent is hereby corrected as shown below:

Column 18, line 61, "ie" should be -- i.e. --;

Column 20, line 15, "are" should be -- arc --;

Columns 29-30, last line, "*GET MA ALUE SUBROUNTINE" should be -- *GET MAX VALUE SUBROUNTINE --;

Column 60, line 1, the vertical line in the formula should be slanted.

Signed and Sealed this

Twelfth Day of August, 1997

*Attest:*

BRUCE LEHMAN

*Attesting Officer*     *Commissioner of Patents and Trademarks*